(12) United States Patent
Lu

(10) Patent No.: US 11,092,141 B1
(45) Date of Patent: Aug. 17, 2021

(54) METHOD AND SYSTEM FOR GENERATING LARGE-SCALE RENEWABLE ENERGY BY PRESSURE-ENHANCED OSMOSIS AND SYNERGISTIC EFFECTS

(71) Applicant: James Cheng-Shyong Lu, Huntington Beach, CA (US)

(72) Inventor: James Cheng-Shyong Lu, Huntington Beach, CA (US)

( * ) Notice: Subject to any disclaimer, the term of this patent is extended or adjusted under 35 U.S.C. 154(b) by 0 days.

(21) Appl. No.: 16/906,690

(22) Filed: Jun. 19, 2020

(51) Int. Cl.
*F03G 3/00* (2006.01)
*B01D 61/00* (2006.01)
(Continued)

(52) U.S. Cl.
CPC ............ *F03G 3/00* (2013.01); *B01D 61/005* (2013.01); *B01D 61/027* (2013.01); *B01D 61/145* (2013.01); *B01D 61/58* (2013.01); *B01D 63/06* (2013.01); *C02F 1/442* (2013.01); *C02F 1/444* (2013.01); *C02F 1/445* (2013.01);
(Continued)

(58) Field of Classification Search
CPC .. F03G 3/00; C02F 1/444; C02F 1/442; C02F 1/445; C02F 2103/18; C02F 2209/03; C02F 2103/007; B01D 61/027; B01D 61/58; B01D 63/06; B01D 61/005; B01D 61/145; B01D 2313/18; B01D 2311/16; B01D 2311/14; B01D 2311/25; B01D 61/002; B01D 2319/04
See application file for complete search history.

(56) References Cited

U.S. PATENT DOCUMENTS 3,707,231 A * 12/1972 Bradley ................. B01D 69/08
210/98
3,906,250 A 9/1975 Loeb
(Continued)

FOREIGN PATENT DOCUMENTS

KR 20120068067 * 6/2012

OTHER PUBLICATIONS

English language machine translation of KR20120068067, 10 pages, No Date.*
(Continued)

*Primary Examiner* — Pranav N Patel
(74) *Attorney, Agent, or Firm* — Mei & Mark LLP; Manni Li

(57) ABSTRACT

Method and apparatus are disclosed for maximizing the generation of large-scale renewable energy (LSRE) by pressure-enhanced osmosis (PEO) and synergistic effects, in which a PEO module is designed by increasing the maximum power generation by increase of the dilution factor $\beta$ to enhance a power output beyond ten times of the conventional PRO method, and even more power can be generated by the PEO method by incorporation with synergistic effects to form two types of PEO systems: (1) a surficial PEO system, in which the synergistic effects are achieved through combined effects of FO and nanofiltration (NF) or ultrafiltration (UF), and application of an energy exchange and fluid recovery device for re-concentration and reuse of the draw solution, (2) a subsurface PEO system, synergistic effects are achieved through application of the gravitational potential, application of waste heat from power generation, and application of an uplift chamber.

9 Claims, 10 Drawing Sheets

(51) Int. Cl.
*C02F 1/44* (2006.01)
*B01D 61/02* (2006.01)
*B01D 61/14* (2006.01)
*B01D 61/58* (2006.01)
*B01D 63/06* (2006.01)
*C02F 103/00* (2006.01)
*C02F 103/08* (2006.01)

(52) U.S. Cl.
CPC ...... *B01D 2311/14* (2013.01); *B01D 2311/16* (2013.01); *B01D 2311/25* (2013.01); *B01D 2313/18* (2013.01); *C02F 2103/007* (2013.01); *C02F 2103/08* (2013.01); *C02F 2209/03* (2013.01)

(56) References Cited

U.S. PATENT DOCUMENTS

| | | | |
|---|---|---|---|
| 3,978,344 | A | 8/1976 | Jellinek |
| 4,193,267 | A | 3/1980 | Loeb |
| 6,313,545 | B1 | 11/2001 | Finley et al. |
| 6,559,554 | B2 | 5/2003 | Finley et al. |
| 7,329,962 | B2 | 2/2008 | Alstot et al. |
| 8,099,958 | B2 | 1/2012 | Al-Mayahi et al. |
| 8,545,701 | B2 | 10/2013 | Kelada |
| 8,568,588 | B2 | 10/2013 | Kim et al. |
| 9,023,210 | B2 | 5/2015 | Oklejas |
| 2012/0267306 | A1* | 10/2012 | McGinnis ............ C02F 1/04 210/637 |
| 2019/0054421 | A1* | 2/2019 | Wei ............ B01D 61/002 |

OTHER PUBLICATIONS

Shibuya et al, Effects of operating conditions and membrane structures on the performance of hollow fiber forward osmosis membranes in pressure assisted osmosis, Desalination 365 (2015) 381-388. (Year: 2015).*

Blandin et al, Validation of assisted forward osmosis (AFO) process: Impact of hydraulic pressure, Journal of Membrane Science 447 (2013) 1-11. (Year: 2013).*

Kook et al, Serially connected forward osmosis membrane elements of pressure-assisted forward osmosis-reverse osmosis hybrid system: Process performance and economic analysis, Desalination 448 (2018) 1-12. (Year: 2018).*

International Energy Agency, "Renewable Information 2019 Overview," Wikipedia: https://en.wikipedia.org/wiki/Renewable_energy (2019).

Achilli et al., "Pressure retarded osmosis: From the vision of Sidney Loeb to the first prototype installation—Review," Desalination, vol. 261, pp. 205-211 (2010).

Loeb, S., et al., "Production of energy from concentrated brines by pressure-retarded osmosis, I. Preliminary technical and economic correlations,"Journal of Membrane Science, vol. 1, pp. 49-63 (1976).

Loeb, S. et al., "Production of energy from concentrated brines by pressure-retarded osmosis, II. Experimental results and projected energy costs," Journal of Membrane Science, vol. 1, pp. 249-269 (1976).

Loeb, S., et al., "Comparative mechanical efficiency of several plant configurations using a pressure-retarded osmosis energy converter," Journal of Membrane Science, vol. 51, pp. 323-335 (1990).

Loeb S., "Large-scale power production by pressure-retarded osmosis, using river water and sea water passing through spiral modules," Desalination, vol. 143, 115-122 (2002).

Skramesto, O. S., et al., "Power production based on osmotic pressure," https://www.statkraft.com/globalassets/old-contains-the-old-folder-structure/documents/waterpower_xvi_-_power_production_based_on_osmotic_pressure_tcm21-4795.pdf/,pp. 1-10 (2008).

Patel, S., "Statkraft shelves osmotic power project," Power Magazine, pp. 1-2 (Feb. 28, 2014).

Achilli et al, "Power generation with pressure retarded osmosis: An experimental and theoretical investigation," J. of Membrane Science, vol. 343, pp. 42-52 (2009).

Wikipedia, "Statukraft osmotic power prototype in Hurum," https://en.wikipedia.org/wiki/Statkraft_osmotic_power_prototype_in_Hurum, pp. 1-2 (May 2018).

Wikipedia, "Renewable energy," https://en.wikipedia.org/wiki/Renewable_energy, pp. 1-29 (Dec. 2019).

Wikipedia, "Osmotic power," https://en.wikipedia.org/wiki/Osmotic_power, pp. 1-7 (Mar. 30, 2019).

* cited by examiner

Fig. 3A -- PRIOR ART --

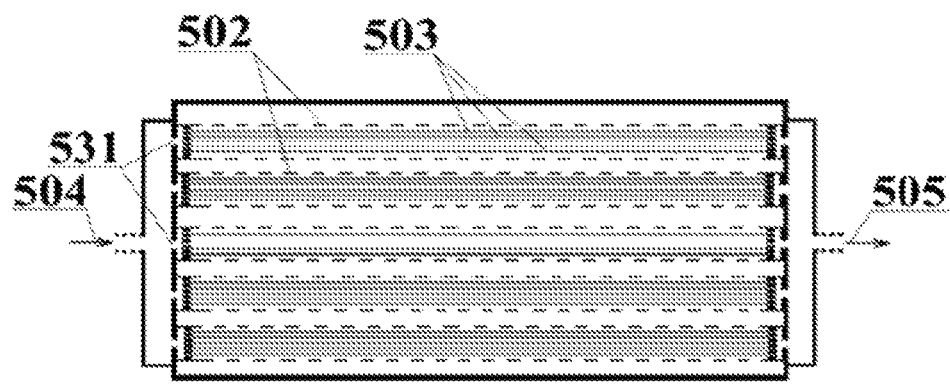
Fig 5C (Cross-Section A-A')
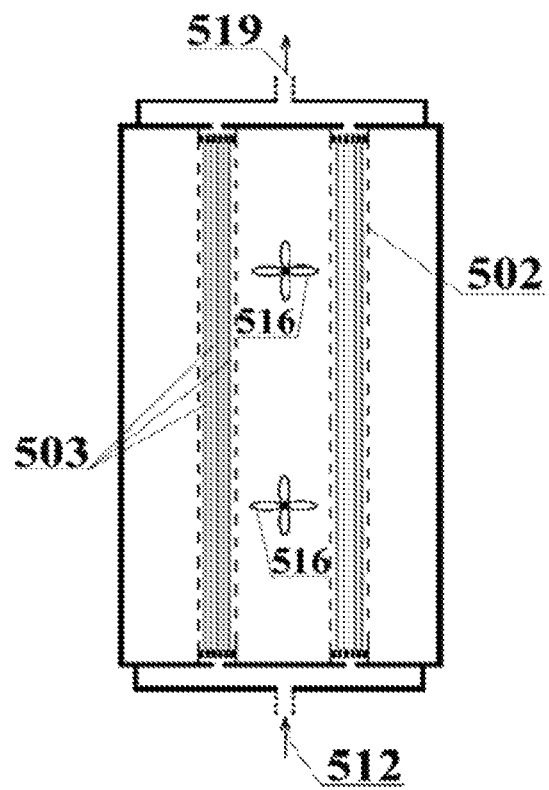
Fig 5D (Cross-Section B-B')

METHOD AND SYSTEM FOR GENERATING LARGE-SCALE RENEWABLE ENERGY BY PRESSURE-ENHANCED OSMOSIS AND SYNERGISTIC EFFECTS

BACKGROUND OF THE INVENTION

Field of the Invention

The present invention relates to renewable energy technology, particularly, method and system for generating large-scale renewable energy through forward osmosis (FO) with collaboration and augmentation of pressure-enhanced osmosis (PEO) and synergistic effects.

Description of the Background Art

It was reported that renewable energy contributed about 24.3% for the worldwide generation of electricity in 2016, in which 16.3% were from hydropower and the remaining 8% were from other renewable energy sources such as wind, solar, geothermal, biomass, and tidal power (IEA: Renewable Information 2019 Overview). Many advantages are associated with the application of renewable energy, including large-scale supply available, derivation from natural processes that are replenished constantly, potential for environmental pollution (such as air pollution) prevention or reduction, and no cost needed for obtaining energy sources comparing to nonrenewable energy sources of fossil fuels and nuclear power. As a result, renewable energy systems are rapidly becoming popular and their share of total energy consumption is increasing. Use of the renewable energy has further motivated by global warming and other ecological as well as economic concerns. As of 2019, it was reported that more than two-thirds of worldwide newly installed electricity capacity were from renewable energy sources contributing about 25.8% for the worldwide generation of electricity. Renewable energy markets are projected to grow more rapidly in the coming decade and beyond. Many countries have set a goal to reach 100% renewable energy in the future.

Osmotic power has the potential to become a large-scale renewable energy source even beyond the supply of hydropower, however, it has not gained attention for actual applications as of today. Although the history of osmosis goes back to 1748 when the phenomenon was discovered by Jean-Antoine Nollet. Not until about 150 years later, the application of semipermeable membrane in osmosis and quantification of osmotic pressure were developed and introduced by Van't Hoff in 1901. In 1954, R. E. Pattle suggested that when a river mixes with the sea, a significant quantity of energy can be harvested (Achilli, A, and A. E. Childress: Desalination 261, 205-211). Based on calculation result from the Van't Hoff's osmosis formula, when contacting fresh water and seawater through a semipermeable membrane the hydraulic head created by osmosis can be much greater than that of any existing hydroelectric power plants in the world. Besides the above stated large-scale energy supply available, osmotic power also have the advantages of stable and controllable supply unlike that of other renewable energy sources such as wind, solar, and tidal power.

Although osmotic power can become one of the major renewable energy sources, but how to get the osmotic energy cost-effectively out from the osmotic module for application is one of the major concerns. Not until 1975, an effective and practical method and apparatus for obtaining energy out from the osmosis module were first disclosed by Sidney Loeb in U.S. Pat. No. 3,906,250. The method developed by S. Loeb, called "Pressure-Retarded Osmosis (PRO)," is based on the design that a hydraulic pressure is added to the high pressure compartment when two liquids having different osmotic pressures are separated by a semipermeable membrane in a two-compartment osmotic module. In the two-compartment osmotic module, an osmotic pressure difference can be created which the solvent of the less concentrated liquid will permeate to the more concentrated side and increase the pressure in the compartment containing the more concentrated solution. In other worlds, PRO is the method of adding a hydraulic pressure to the draw solution side of a "forward Osmosis (FO)" module to obtain and push a volume of mixed solution equivalent to that of the pressurized permeant for power generation. The major criterium is to keep the hydraulic pressure in the draw solution side to less than the osmotic pressure difference across the membrane so the permeant will occur. S. Loeb uses an example of 1 $m^3$ of seawater, 0.6 $m^3$ of permeant and 10 atm of hydraulic pressure to create a theoretical energy outcome of 0.168 kwh, or generate 0.28 kwh/m3 of permeant volume. The patent shows that the theoretical average-maximum-equilibrium osmotic pressure in the draw solution compartment is only 15.63 atm (i.e., 25 atm×1/(1+0.6)=15.63), and there is no optimum PRO condition and no disclosure on how to enhance the PRO pressure for increasing energy output.

In 1976 S. Loeb further published two papers to explain the technical and economic correlations, as well as evaluate experimental results and energy costs of PRO (Loeb, S, J. of Membrane Science 1, 49-63 and 249-269). Objective of his efforts was to determine whether energy can be produced economically by PRO. Evaluations were based on net power delivery and mechanical efficiency of various feed and draw conditions and assumptions of efficiencies and cost units of system components involved. These two papers concluded that PRO costs are highly dependent on the mechanical efficiency estimated. And mechanical efficiency is mainly affected by ratio of flow volume pumping into the draw compartment to flow volume of permeant diffusing into the draw compartment. It was suggested by Loeb that the ratio cannot have a value much higher than about 2. Another interesting result from his tests discovered and verified that the slope of the lines of water flux of permeant vs. PRO differential pressure used was essentially the same (in the order of 0.0011 to 0.0013 $m^3/m^2$ day atm) no matter what salt concentrations of draw and feed solutions used. Although the PRO method and the formula developed by these two papers contributed significantly to the advance of utilizing osmotic power, but the data assumed might not be real and could affect the conclusions greatly. For example, the efficiencies assumed for generator and hydro-turbine were 98% and 92%, respectively, which for most reported data of actual hydropower plants are usually only about 70 and 80%, respectively, therefore, the conclusion on power generation could be overestimated by about 60% (i.e. (98%×92%)/(70%×80%)=1.61) just on these two assumptions alone. Most other assumed data are also in the favorable sides, and would further affect conclusions. Another problem is that the optimum pressures of PRO under different osmotic differential pressure conditions were not evaluated. Due to the fact that the permeant flow through the semipermeable membrane is slow, compounded by the fact that no mixing to maintain uniform draw solution concentration in the osmotic module, which could cause the test module in non-equilibrium and unsteady-state situations. If no method provided for the dilution ratio control between draw and feed solutions during the osmotic operation, the non-equilibrium and unsteady-state situations may occur based on Brownian effect and Bernoulli's principle, which will be further discussed later in this document.

In 1980 U.S. Pat. No. 4,193,267 to Loeb discloses improvement of the PRO design, in which a concentrated solution at a high hydraulic pressure is passed along the draw solution side compartment, and a dilute solution at a low hydraulic pressure is passed along the feed solution side compartment of the osmotic module to produce permeate flux by osmosis. Unlike the PRO design in U.S. Pat. No. 3,906,250, an extra pressure is applied to the flushing solution, in addition to the PRO pressure applied to the draw solution side compartment, for power generation. Both flushing and draw solutions are re-combined for power generation to enhance the quantity of power generated. The diluted re-combined solution is recycled and re-concentrated by thermal processes (e.g., evaporation by solar) and re-pressurization method. In the invention, due to the need for re-concentration and extra pressure need for pumping flushing solution, additional energy is required comparing to that of the previous PRO design. However, no quantitative evaluation of net energy output is given in the invention. The advantage of using the improved PRO method is, therefore, unknown. Again, the optimum hydraulic pressures required for PRO is also not discussed in the invention. How to enhance the hydraulic pressure to enhance the power generation is also not discussed.

A paper presented in 1990, Loeb, S. et al., J. of Membrane Science 51, 323-335, evaluated mechanical efficiency results of three types of PRO plants: (1) continuous flow, terrestrial PRO plant, (2) continuous flow, underground PRO plant, and (3) alternating flow, terrestrial PRO plant. Freshwater and 3.5% NaCl saltwater were used for osmotic power evaluation. Calculation results of mechanical efficiency of overall power generation (including osmosis and turbine/generator combinations) for the above three types of PRO plants are 28%, 59%, and 74%, for PRO plants (1), (2), and (3), respectively. The article suggested that only types (2) and (3) PRO plants are efficient to operate, but need high capital requirements to build the PRO plants. In review of the above conclusions it is found, again, that most assumed data are rather optimistic, and could result in over estimation of the efficiencies. The optimum hydraulic pressures required for PRO were also not evaluated. Again, no method was mentioned for the control of osmotic pressure between the draw and the feed solutions as well as permeant flux changes during the osmotic operation which might affect the calculation results.

A paper published in 2002, Loeb S., Desalination 143, 115-122, evaluated the economic feasibility of large-scale power production through spiral modules by contacting a medium-scale river water flow (3 million $m^3/d$) to seawater. A ratio of 5 to 2 was selected for seawater input volume to permeant volume in the draw solution compartment. The hydraulic pressure selected for evaluation was 12 atm. A pressure exchange method was first introduced to the PRO system to simplified design and eliminated a large parasitic consumption of power. Through optimistic assumptions of mechanical efficiencies and K-term (the resistance to solute diffusion in the porous substructure of the membrane), his calculation results show that even a K-value of 10 d/m of power generation cost will not be economical. However, when the size of the river flow increases, using the Mississippi River (1,500 million $m^3/d$) as an example, it became economical. Therefore, the article suggested that the large-scale renewable osmotic power production justifies further investigation.

Based on the PRO methodology the world's first osmotic (prototype) power plant was developed in Hurum, Norway, in 2009 by Statkraft (Skramesto, O. S., S. E. Skihagen, W. K. Nielsen). A water usage of 10 l/sec of freshwater and 20 l/sec of seawater as well as the PRO pressure of 11 to 14 bars were selected for the plant. It was expected that the prototype plant could result in a design power output of 10 kw, a real output of 2-4 kw and approximately 3 $w/m^2$ of power density of the membrane. Although the technology was proven "works" by Statkraft, unfortunately, the plant was shut down in 2013 due to economic concerns (Patel, S.: Power Magazine, Feb. 28, 2014). It was reported that to make PRO profitable the power density of the membrane should be at least in the range of 4-6 $w/m^2$.

A PRO model was developed to predict water flux and power density under specific experimental conditions by Achilli, A, et al (Achilli, A., T. Y. Cath, A. E. Childress: J of Membrane Science 343, 42-52) in 2009. The model was tested using experimental results from a bench-scale PRO system. An improved cellulose triacetate (CTA) FO membrane and NaCl solutions at various concentrations were selected for testing. The following test conditions were used for evaluation: feed solutions concentrations at 0, 2.5, and 5 g/l, draw solutions concentrations at 35 and 60 g/l, and hydraulic pressure differentials of 0, 310, 650, and 970 kPa. Both the derived PRO model and the experimental results confirmed that the power density reaches a maximum when hydraulic pressure differential equals to half value of the osmotic pressure differential. At a pressure of 970 kPa (or 9.57 atm) the permeate flux achieved were between $1.8 \times 10^{-6}$ and $2.8 \times 10^{-6}$ m/s, and the power densities for the membrane selected were up to 2.8 $w/m^2$ for the 35 g/l NaCl draw solution at 0.5 l/min of both draw and feed solution flux. The experimental results also showed that magnitudes of internal concentration polarization (ICP) plus salt passage increase with increasing feed solution concentrations while the magnitudes of external concentration polarization (ECP) increases with increasing draw solution concentrations. It reported that, for the asymmetric membrane employed the power density was substantially reduced due to sever ICP, and to a lesser degree to reverse salt dilution. ECP was found to exhibit a relatively small effect on reducing the osmotic driving force.

Methods other than the PRO method also have been disclosed in various patents for utilizing the osmotic pressure to generate energy from the freshwater/seawater system. U.S. Pat. No. 3,978,344 discloses a method of using nozzles to eject mixed solution of saltwater and freshwater permeant from an osmotic container to push a waterwheel or a turbine for power generation. In the approach the energy needed to pump the seawater into the osmotic container is not considered. Due to the fact that the energy required for seawater pumping into the osmotic container could consume more energy than that of the energy generated by the subject design, feasibility of this approach shall be further evaluated as will be further discussed later in this invention.

Three U.S. Pat. Nos. 6,313,545; 6,559,554; and 7,329,962 sequentially disclose an osmotic power generation method and apparatus, called "hydrocratic generator", in a manner that does not utilize a semipermeable membrane. The method claims that osmotic power can be released based on mixing a relative low salinity water (i.e., freshwater) with a relatively high salinity water (i.e., seawater) in a bottom of a vertical tubular shape housing, the latent osmotic energy can be generated. It is also claimed that the latent energy is compounding with the kinetic energy of the "upwelling flow" caused by the mixed lower salinity water in the tubular housing to create lower density mixed water. The method further claims that a ratio of greater than 8:1 saltwater to freshwater, or more preferably 30:1, and most preferably 43:1 or higher are preferred. It is believed that generation of osmotic power requiring a semipermeable membrane to create the Brownian Movement phenomenon to produce osmotic pressure differential. Just mixing two different salinity waters in the bottom of a tube does not create an environment for osmotic pressure generation. It is suggested that the energy gaining by the "hydrocratic generator" might be mainly from the hydraulic head of the low salt water in the tube. Based on the extremely high ratios of saltwater to freshwater as claimed, the effects of "upwelling flow" (more specifically, it is the uplifting flow in the tubular housing caused by water density difference) will be very minimal.

U.S. Pat. No. 8,099,958 relates to a method for osmotic energy generation by contacting two streams (one lower osmotic potential liquid and another higher osmotic potential solution) in a semipermeable membrane apparatus which creating pressurized solution to drive a prime mover (i.e., turbine-generator device) for power generation. The diluted pressurized solution is then concentrated to the original solution concentration level by various methods for recovery and reinjection into the semipermeable membrane apparatus. The re-concentration methods claimed are thermal or membrane separation processes including evaporation, distillation, crystallization by wind energy, solar energy, geothermal energy, or energy from combustion of fuel and/or excess heat from power plants and other industrial processes. Based on the system discussed in this patent, the energy (or pressure) necessary for injection of the recovered solution into the semipermeable membrane apparatus is not considered. If the energy needed for the injection of the recovered solution is higher than the energy needed for the re-concentration, a negative generation of power by this invention could be resulted.

U.S. Pat. No. 8,545,701 introduces a process referred to as "Induced Symbiotic Osmosis (ISO)" for maximizing the electric power generation by employing series of osmotic cells, each forming a closed hydraulic loop having pumping means, power generation turbine means, and shared semipermeable membranes between adjacent cells. Ionic inorganic salts selected from the group consisting of chlorides of sodium, magnesium, and calcium are used as the draw solution. In the ISO approach, an extremely high concentration of a draw solution is stepwise reduced in a series of osmotic cells to generate power. In each step of the osmotic cell, the dilution ratios of the draw solution evaluated are in the 2 to 5 ranges. No specific re-concentration methods and energy needed for re-concentration are disclosed. The pressure needed for injection of higher concentration of liquid into the drawing solution compartment is also not optimized in this invention. Based on this ISO approach, multiple osmotic cells in series and each cell requiring a separate turbine-generator system are selected. However, more energy can be generated if all cells in series can be combined into a system or in parallel systems and applying only one set of turbine-generator unit more energy can be gained.

U.S. Pat. No. 8,568,588 discloses apparatus for both power generation and desalination by employing series of forward and reverse osmosis methods based on arrangements of three saltwater streams at different salt concentrations. Basically, PRO power generation scheme is also selected for this invention. However, no net power generation and optimization of PRO are evaluated.

U.S. Pat. No. 9,023,210 provides systems to recover hydraulic energy of the osmotic flow to maximize efficiency of the process. A common shaft connecting to the turbine shaft is arranged to apply rotating energy generated to directly pump freshwater, saltwater, recirculation fluids and rotate generator. However, no evaluation of energy saving, or efficiency improvement are disclosed. It is suggested that the PRO design by Loeb as discussed above by using the pressure exchange for saltwater injection would be more energy saving. The common shaft design proposed may not be efficient due to mechanical alterations of every pump listed above is necessary which would lose more energy than that of the PRO pressure exchange design.

Based on the above discussions it is clear that, as of now, PRO system is still the best process available which can get the energy out of the osmotic module in a feasible way. Methods such as hydrocratic generator, ISO, or operation without consideration of the energy needed for injection of concentrated draw solution may not be feasible or cost-effective approaches for generation of large-scale renewable energy from osmotic apparatus.

Osmotic pressure with the potential to generate large-scale renewable energy (LSRE) is well documented in many open literature and existing related patents. Some methods and apparatus have been proposed to get the osmotic energy out of osmotic modules so it can be available for power generation. However, over the past half century most systems proposed are either not cost-effective or feasible. For example, methods of using nozzles to eject mixed solution of saltwater and freshwater permeant from an osmotic module to push a waterwheel or a turbine for power generation may not work due to the energy needed to pump the seawater into the osmotic module could consume more energy than that of the energy generated by the design. The "hydrocratic generator" disclosed in the existing patent, in a manner that does not utilize a semipermeable membrane, is obvious not working due to the violation of the Brownian Motion principle. Several osmotic energy generating methods discussed in existing patents are neglect the energy needed for injection of the draw solution into the osmotic module or for re-concentration of the draw solution if other high salt liquid, not the seawater, is used. If the energy needed for the injection of the draw solution into the osmotic module or energy needed for re-concentration of the draw solution is higher than energy generated by the osmotic power generating system, a negative energy output could occur. The negative output situations may happen for some forward osmosis (FO) methods either by arrangement of FO modules in series with high dilution ratios (such as the Induced Symbiotic Osmosis (ISO) method mentioned above) or recirculation of draw solution by certain types of high energy consuming re-concentration methods.

Based on the background art discussed, as of now, Pressure-Retarded Osmosis (PRO) system invented by S. Loeb is still the best method available which can get the energy out of the osmotic module in a feasible way. However, both the low mechanical efficiency of the overall PRO apparatus and low power density of membrane affect the application of the PRO method. S. Loeb concluded that PRO mechanical efficiency is mainly affected by ratio of flow volume pumping into the draw compartment to flow volume of permeant diffusing into the draw compartment. It was suggested by S. Loeb that this ratio cannot have a value much higher than about 2 in order to improve mechanical efficiency. It also suggested that making PRO profitable the power density of the membrane should be at least in the range of 4-6 w/m². As of now, only approximately 3 w/m² of power density of the membrane was obtained by the first PRO osmotic (prototype) power plant. Besides the low mechanical efficiency and low power density affecting the output of osmotic power, other problems may also involve with the PRO system, such as: (1) only the amount equivalent to the pressurized permeate flux can be used for power generation which greatly reduce the quantity of net power generated, even in the condition of optimum PRO hydraulic pressure used, (2) the low flowrate ratio (i.e. ≤2) of input draw solution to permeant selected causing the inability of using the optimum or highest osmotic pressure differential, therefore, significantly reduce the quantity of pressurized mix solution produced in the draw solution compartment for power generation, (3) possibility of non-equilibrium and unsteady-state situations may occur in the PRO system especially for non-uniformity of draw solution concentration in the osmotic module and for long-term operation of the system which no method is provided for the prevention of such conditions.

SUMMARY OF THE INVENTION

The objective of the present invention is to provide improved methods and apparatus to maximize the generation of large-scale renewable energy (LSRE) by forward osmosis (FO) through contact between draw and feed solutions with the assistance of pressure-enhanced osmosis (PEO) and synergistic effects. Using a PEO module for maximizing power generation is achieved by increase of osmotic pressure in the draw solution compartment by increase of the dilution factor $\beta$ which is the ratio between draw solution input flux and summation of input flux and permeate flux. The PEO module is able to generate more than ten times of power than that of using the conventional Pressure-Retarded Osmosis (PRO) module if a proper $\beta$ value is selected. When the PEO module is assisted by the synergistic effects, the resulted PEO system can generate even more power than that of the conventional PRO power generation system. Two types of PEO system are selected for the generation of large-scale renewable energy (LSRE), the surficial and subsurface PEO power generation systems. For the surficial PEO system, synergistic effects are achieved through the augmentation of the osmotic power generation by application of the combined FO and nanofiltration (NF) or ultrafiltration (UF), and application of the combined energy exchange and fluid recovery device for re-concentration and reuse of the draw solution. For the subsurface PEO system, synergistic effects are achieved through the augmentation of the osmotic power generation by application of the gravitational potential to pressurize draw solution injection, application of heat generated from power generation to increase osmotic pressure and permeate flux, and application of an uplift chamber to dissipate pressure released flow by an increased uplifting flow and density reduction through heating, sparging and dilution effects of the less dense saltwater. Additional synergistic effects are achieved by the diversion/discharge of the penstock waterflow for the subsurface PEO system, so an additional hydropower plant can be installed.

BRIEF DESCRIPTION OF THE DRAWINGS

FIG. 3A shows the conventional PRO system with a pressure exchange unit.

FIG. 5C shows the A-A' cross-sectional view of the PEO module of FIG. 5B; and FIG. 5D shows the B-B' cross-sectional view of the PEO module of FIG. 5B.

DETAILED DESCRIPTION OF THE INVENTION

The present invention provides an innovative approach of Pressure-Enhanced Osmosis (PEO) module to maximize the osmotic power generation by the conventional PRO module. The power generation is further maximized by the synergistic effects when the seawater-river water pair or any other draw-feed solution pairs are used for osmotic power generation. The basic principles, methods and apparatus, existing problems and solutions, as well as illustration cases are explained as follows.

1. Basic Principles and Maintenance of Steady-State Equilibrium Condition

Figure 2:
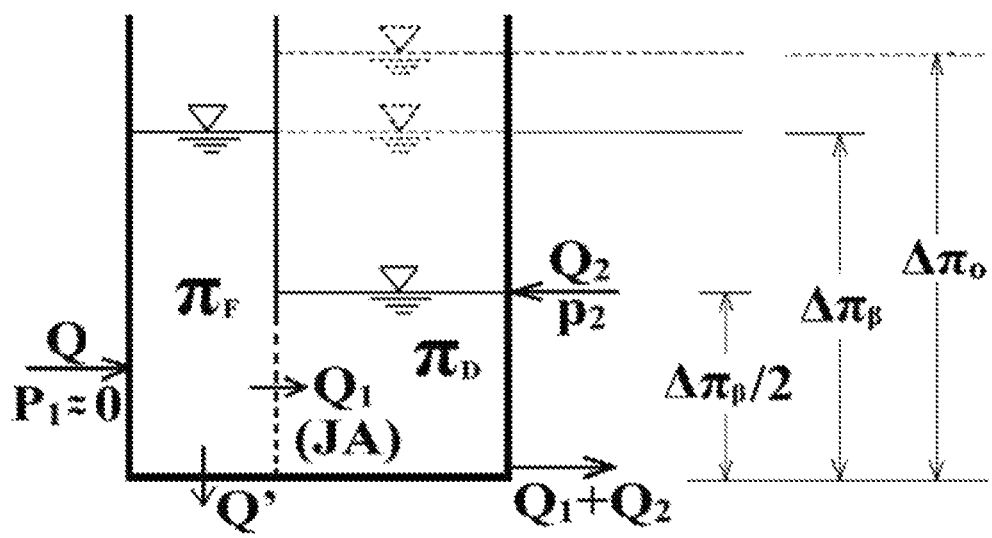
FIG. 2 shows osmotic pressure at steady-state conditions in the present invention.

Traditionally generation of energy by osmotic power is mainly based on the forward osmosis (FO) operation. When an FO module separating by a semipermeable membrane into two compartments, one draw solution compartment with osmotic pressure $\pi_D$ and the other feed solution compartment with osmotic pressure $\pi_F$, an osmotic pressure differential $\Delta\pi$ is formed, as illustrated in FIG. 2. The theoretical maximum osmotic pressure differential $\Delta\pi_o$ in the FO module at the static equilibrium condition can be calculated as:

$$\Delta\pi_o = \pi_D - \pi_F \quad (1)$$

where, $\pi_D$ and $\pi_F$ can be estimated by the Van't Hoff's osmotic pressure formula:

$$\pi = RT\Sigma M_i \quad (2)$$

where $\pi$ is the osmotic pressure, R is the ideal gas constant, T is the absolute temperature in kelvins, and $\Sigma M_i$ is summation of all the solute molal concentrations in the osmosis system with i-types of solute species. Examples of the theoretical maximum osmotic pressure differential $\Delta\pi_o$ between freshwater and a typical seawater are shown in Table 1. Effects of temperature on the maximum osmotic pressure differential $\Delta\pi_o$ are also provided for reference, where showing that when seawater temperature increases from 10° C. to 35° C. the $\Delta\pi_o$ difference is quite significant at 22.58 m of hydraulic pressure.

able to move to contact the membrane for diffusion to the feed solution compartment. The phenomenon causes the draw solution compartment gradually becoming a pressure vessel until that a theoretical maximum pressure differential of $\Delta\pi_o$ in the static equilibrium condition is reached. The pressure buildup in the draw solution compartment is so gigantic, which, if can be retrieved effectively for power generation, would be much greater than the hydraulic pressure of the Three-Gorge Power Plant. As discussed above, the PRO method is probably the only method actually practiced so far to retrieve the osmotic pressure for power

TABLE 1

Examples of Omotic Pressure Differential Between Freshwater and Seawater

| Seawater | | | | $\Delta\pi_o$ at 10° C. | | | $\Delta\pi_o$ at 25° C. | | | $\Delta\pi_o$ at 35° C. | | |
|---|---|---|---|---|---|---|---|---|---|---|---|---|
| Composition | ppm | MW | M | $\Delta\pi_o$ (psi) | $\Delta\pi_o$ (atm) | $\Delta\pi_o$ (m) | $\Delta\pi_o$ (psi) | $\Delta\pi_o$ (atm) | $\Delta\pi_o$ (m) | $\Delta\pi_o$ (psi) | $\Delta\pi_o$ (atm) | $\Delta\pi_o$ (m) |
| $Cl^-$ | 19811 | 35.5 | 0.5588 | 177.13 | 12.05 | 124.51 | 186.52 | 12.69 | 131.11 | 192.78 | 13.12 | 135.51 |
| $Na^+$ | 11020 | 23.0 | 0.4793 | 151.93 | 10.34 | 106.80 | 159.98 | 10.89 | 112.46 | 165.35 | 11.25 | 116.23 |
| $SO_4^{-2}$ | 2765 | 96.1 | 0.0288 | 9.12 | 0.62 | 6.41 | 9.61 | 0.65 | 6.75 | 9.93 | 0.68 | 6.98 |
| $Mg^{+2}$ | 1328 | 24.3 | 0.0547 | 17.32 | 1.18 | 12.18 | 18.24 | 1.24 | 12.82 | 18.85 | 1.28 | 13.25 |
| $Ca^{+2}$ | 418 | 40.1 | 0.0104 | 3.30 | 0.22 | 2.32 | 3.48 | 0.24 | 2.44 | 3.59 | 0.24 | 2.53 |
| $K^+$ | 418 | 39.1 | 0.0107 | 3.39 | 0.23 | 2.38 | 3.56 | 0.24 | 2.51 | 3.68 | 0.25 | 2.59 |
| $CO_3^{-2}$ | 148 | 60.0 | 0.0025 | 0.78 | 0.05 | 0.55 | 0.82 | 0.06 | 0.58 | 0.85 | 0.06 | 0.60 |
| $Br^-$ | 68.4 | 79.9 | 0.0009 | 0.27 | 0.02 | 0.19 | 0.29 | 0.02 | 0.20 | 0.30 | 0.02 | 0.21 |
| $H3BO^{-3}$ | 25.2 | 61.8 | 0.0004 | 0.13 | 0.01 | 0.09 | 0.14 | 0.01 | 0.10 | 0.14 | 0.01 | 0.10 |
| $Sr^{+2}$ | 14.4 | 87.6 | 0.0002 | 0.05 | 0.00 | 0.04 | 0.05 | 0.00 | 0.04 | 0.06 | 0.00 | 0.04 |
| Si | 4.0 | 28.1 | 0.0001 | 0.05 | 0.00 | 0.03 | 0.05 | 0.00 | 0.03 | 0.05 | 0.00 | 0.03 |
| Org-Carbon | 3.0 | 12.0 | 0.0003 | 0.08 | 0.01 | 0.06 | 0.08 | 0.01 | 0.06 | 0.09 | 0.01 | 0.06 |
| $Al^{+3}$ | 1.9 | 27.0 | 0.0001 | 0.02 | 0.00 | 0.02 | 0.02 | 0.00 | 0.02 | 0.02 | 0.00 | 0.02 |
| $F^-$ | 1.4 | 19.0 | 0.0001 | 0.02 | 0.00 | 0.02 | 0.02 | 0.00 | 0.02 | 0.03 | 0.00 | 0.02 |
| $NO^{-3}$ | 3.1 | 62.0 | 0.0001 | 0.02 | 0.00 | 0.01 | 0.02 | 0.00 | 0.01 | 0.02 | 0.00 | 0.01 |
| Org-N | 0.2 | 14.0 | 0.0000 | 0.00 | 0.00 | 0.00 | 0.00 | 0.00 | 0.00 | 0.00 | 0.00 | 0.00 |
| $Li^+$ | 0.1 | 6.9 | 0.0000 | 0.00 | 0.00 | 0.00 | 0.01 | 0.00 | 0.00 | 0.01 | 0.00 | 0.00 |
| Total | 36014 | | 1.1466 | 363.62 | 24.74 | 255.61 | 382.89 | 26.06 | 269.15 | 395.74 | 26.93 | 278.19 |

In the physical phenomenon, occurrence of the osmotic pressure can be explained by the Brownian Movement of all solute particles which are moving endlessly and randomly when temperature is above the absolute level. When the two osmotic module compartments separating by a semipermeable membrane have the same solvent but with different solute concentrations osmotic pressure differential is formed. As in the case of power generation by river water (feed solution) vs. seawater (draw solution) in an osmotic module, higher osmotic pressure in the draw solution compartment is formed due to more water molecules can be diffused through the semipermeable membrane from the feed side to the draw side compartments through Brownian Movement. The osmotic pressure build-up in the draw side compartment is significant for seawater vs freshwater as shown in Table 1 which is about 269 m at 25° C. of hydraulic head pressure and can be retrieved for power generation. For example, the largest hydropower plant has ever been built so far is the Yangtze River Three-Gorge Power Plant which only has the highest hydraulic head of 113 m, less than half of the seawater osmotic pressure as shown in Table 1. Selection of a semipermeable membrane which can screen out most solute salt species, but are permeable for water molecules is important for the generation of osmotic pressure differential. In the situation, more water molecules are able to diffuse through the membrane from the feed side to the draw side compartments due to the fact that interference of water particle movement in the draw solution compartment by solute particles occurs so less water molecules are generation. If it is without the semipermeable membrane, the osmotic pressure differential will not occur. This also can be used to explain why methods such as the "hydrocratic generator" method proposed will not work due to no semipermeable membrane to create pressure differential by Brownian Movement phenomenon.

In order to continuously get the osmotic pressure out from the osmotic module for application, a draw solution flux $Q_2$ shall be continuously input into the draw solution compartment with a hydraulic pressure $p_2$, as shown in FIG. 2. Draw solution flux $Q_2$ is able to inject into the pressurized draw solution compartment only when the pressure in the draw solution compartment is not built up by the osmosis to the level greater than that of $p_2$. Meanwhile the feed solution flux Q also needs to replenish to the feed solution compartment with a pressure $p_1$. If the solution in the feed solution compartment is a clean freshwater the $\pi_F$ is approaching zero, so $p_1$ as shown in FIG. 2 is approaching zero. However, if the flushing solution flux Q' is needed to avoid building up of salts in the feed solution compartment from the draw solution compartment, certain $p_1$ levels are needed depending on the hydraulic head required for Q' flowrate generation. A unit permeate flux J (the flowrate per unit membrane area) is formed when the osmotic pressure differential is created in the osmotic module. The permeate flux $Q_1$ as shown in FIG. 2 can then be calculated by:

$$Q_1 = JA \quad (3)$$

where A is the total area of the semipermeable membrane in the osmotic module. In an FO operation, the J value is mainly affected by the membrane characteristics, osmotic pressure differential and potential effective maximum osmotic pressure in the osmotic module. $Q_1$ is also the difference between Q and Q', i.e., $Q_1=Q-Q'$ as shown in FIG. 2.

In theory, if the levels of $p_2$ selected is lower than the effective $\Delta\pi_o$ and when the input and output flows of the draw solution compartment are not in a steady-state equilibrium condition, the pressure in the draw solution compartment could be gradually becoming either higher or lower than $p_2$ depending on situations of building up or lowering down the draw solution volume in the compartment. If the pressure in the draw solution compartment is gradually increasing higher than a selected $p_2$, then the $Q_2$ input will be forced to stop. If the pressure in the draw solution compartment is gradually decreasing, then the designed hydraulic head needed for the subsequent power generation will also fail. Therefore, the steady-state equilibrium condition in the draw solution compartment is extremely critical for the success of osmotic power generation. How to control the draw solution compartment in a steady-state equilibrium condition so far is not discussed in the existing art.

In a nonequilibrium condition the theoretical $\Delta\pi_o$ usually will not be achieved, due to the variations of osmotic pressure differential caused by pressure variations in the draw solution compartment. In dynamic conditions the theoretical $\Delta\pi_o$ also cannot be easily controlled, due to many factors affecting the pressure loss such as concentration polarization and diffusion friction losses associated with the membrane characteristics, potential variations of $p_2$, $Q_1$, and variations of $Q_2$ to $Q_1$ ratio. For the simplicity of engineering design, a membrane efficiency factor $\alpha$ is selected to represent the efficiency of pressure remaining across the membrane. If FO is used, the $\alpha$ value can be in the range of 85 to 97%, and mostly in the range of 90 to 95%. Based on the membrane efficiency the maximum effective osmotic pressure differential, $\Delta\pi_e$, can be calculated as follows:

$$\Delta\pi_e = \alpha \Delta\pi_o \quad (4),$$

Based on the above equation the $\Delta\pi_e$ can be calculated when a dilution ratio of $Q_2$ to $Q_1$ is chosen. A dilution factor $\beta$ is used for the simplicity of estimation of the apparent effective osmotic pressure differential, as follows:

$$\beta = Q_2/(Q_1+Q_2) \quad (5)$$

The range of $\beta$ value can be varied from 0 to 1 by the selection of $Q_1$ and $Q_2$ data for the design of an osmotic power generation module. When $\beta$ is equal to 1, the apparent effective osmotic pressure differential is equal to the maximum effective osmotic pressure differential. When $\beta$ is equal to 0, means no draw solution flux $Q_2$ is pumping into the osmotic module, also means p2 is 0, or means $p_2$ is smaller than the osmotic pressure differential in the draw solution compartment so draw solution flux $Q_2$ is unable to pump into the osmotic module. Application of dilution factor $\beta$ can simply the indication of any apparent effective osmotic pressure differential in an osmotic module where the $Q_2$ and $Q_1$ can be varied for maximize the design of the osmotic power output. The $\beta$ values selected for the PEO module are in the range of 0.85 to 0.95, which are much higher than that of the typical PRO module, as will be further discussed.

The effective osmotic pressure differential $\Delta\pi_\beta$ in the draw solution compartment affecting by the $\alpha$ and $\beta$ factors can then be calculated by:

$$\Delta\pi_\beta = \beta\Delta\pi_e = \alpha\beta\Delta\pi_o \quad (6)$$

Figure 7:
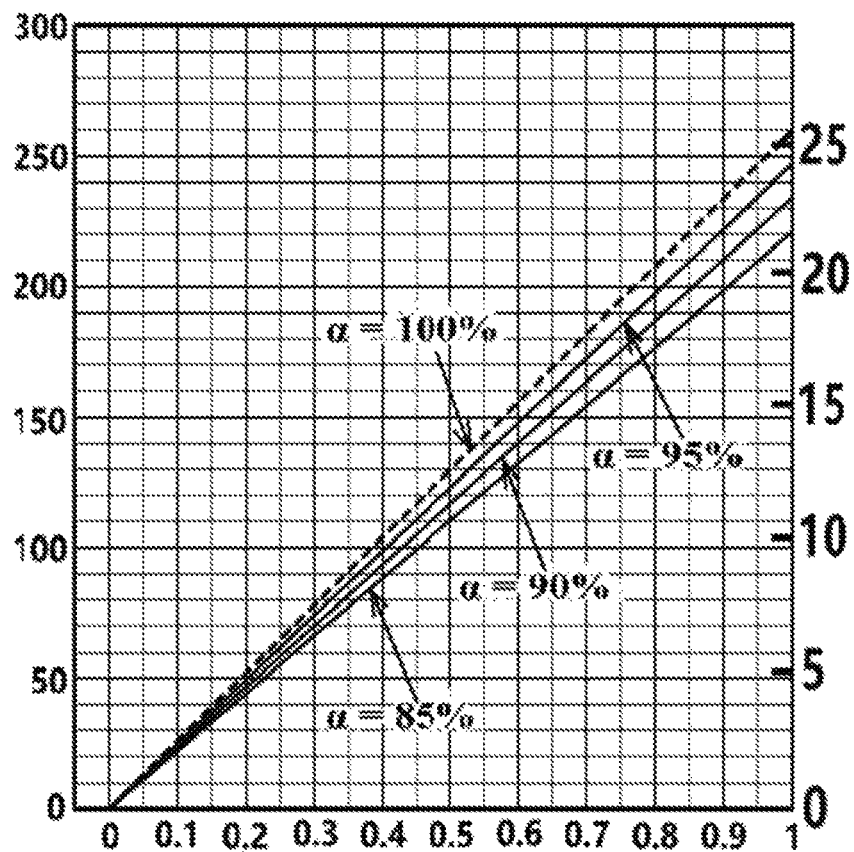
FIG. 7 shows examples of effective osmotic pressure differential affected by $\alpha$ and $\beta$ values in the present invention, wherein the vertical axis on the left side of the chart is osmotic pressure differential (m), and the vertical axis on the right side of the chart is osmotic pressure differential (atm), and the horizontal axis is dilution factor of osmotic pressure differential ($\beta$).

Examples of the effective osmotic pressure differential is a function of $\alpha$ and $\beta$ are shown in FIG. 7.

For the design of an osmotic system for power generation, $Q_2$ and $p_2$ can be selected at any values as long as $p_2$ is less than the corresponding $\Delta\pi_\beta$ and $Q_1$ is greater than zero, as used in the PRO method. However, to obtain maximum power output from an osmotic module, the optimum $p_2$ value should be selected as ½ of each corresponding $\Delta\pi_\beta$ as shown in the background art discussed above. At the optimum $p_2$ condition, $Q_1$ can be estimated by:

$$Q_1)_{optimum} = \tfrac{1}{2}J_\beta A = \tfrac{1}{2}(\Delta\pi_\beta \times \tan\theta)A = \tfrac{1}{2}\Delta\pi_\beta(J_e/\Delta\pi_e)A \quad (7)$$

Where the membrane area "A" value can be selected through engineering design based on membrane characteristics and the required $Q_1$ levels. By combining Equations (6) and (7), it also can be found that $Q_1)_{optimum} = \tfrac{1}{2}\beta JeA$.

As also will be further discussed in the next subsection, the higher the $\Delta\pi_\beta$ or the higher the $\beta$, the higher the power output from an osmotic module can be generated. When $\Delta\pi_\beta$ is selected for an osmotic module, the potential quantity of power W created by the osmotic module can be estimated by the following equation at the steady-state equilibrium condition:

$$W = p_2(Q_1+Q_2) \quad (8)$$

When the optimum $p_2$ value is selected as ½ of the corresponding $\Delta\pi_\beta$, the maximum power $W_{max}$ can be generated by an osmotic module is shown below:

$$W_{max} = \tfrac{1}{2}\Delta\pi_\beta(Q_1+Q_2) \quad (9)$$

2. Comparisons of Osmotic Module Between Pressure-Enhanced Osmosis (PEO) and Pressure-Retarded Osmosis (PRO) for Power Generation A typical conventional PRO system for power generation is shown in FIG. 3A for comparisons. In the FO module 3101, a feed solution input 3105 (such as a freshwater) with a flux Q is pumping into the feed solution compartment 3103 by a pump 3106 and a draw solution input 3112 (such as a seawater) with a flux $Q_2$ is pumping into the draw solution compartment 3102 through a pressure exchanger 3111 and by a pump 3110 with a hydraulic pressure $p_2$. The permeate flow 3107 with a flux $Q_1$ is formed through a FO semipermeable membrane 3104. The draw solution 3109 is withdrawn from a purification system (not shown) and the feed solution output 3108 is discharged to a drain or recycled into a reservoir (not shown) for feed solution input 3105. In this PRO design the pressurized mixed solution output 3113 with flux of $Q_1+Q_2$ can be retrieved for energy generation. In order to provide pressure for pumping the draw solution input 3112, a pressurized solution 3114 is separated from the pressurized mixed solution output 3113 for pressure exchange. The pump 3116 may be needed to compensate any energy loss in the pressure exchange operation. The remaining pressurized solution 3115 is used for power generation. In a PRO design, the flux of pressurized solution for power generation 3115 is usually selected equal to the same flux quantity as $Q_1$. The pressure released flow 3117 is discharged. The pressurized solution for power generation 3115 is used to rotate a turbine 3118, and subsequently using a generator 3119 for power generation. The mixed solution 3120 is discharged. In this PRO design, selection of the $p_2$ and $\Delta\pi_\beta$ levels is most critical for maximizing of the power output. As discussed before, the selection of $\Delta\pi_\beta$ for the PRO design by S. Loeb is based on $Q_2/Q_1 \leq 2$, i.e., $\beta \leq 0.667$. After the $\alpha$ data is experimentally determined and the $\beta$ value is selected, the $\Delta\pi_\beta$ can be calculated based on Equation (6). In order to obtain the $W_{max}$ at the corresponding $\Delta\pi_\beta$, selection of the hydraulic pressure $p_2$ shall be based on ½ of $\Delta\pi_\beta$. However, existing PRO related documents have shown that the selection of hydraulic pressure $p_2$ prior to the development of the Statkraft Osmotic Plant were mostly higher than ½ of $\Delta\pi_\beta$ values.

Figure 4A:
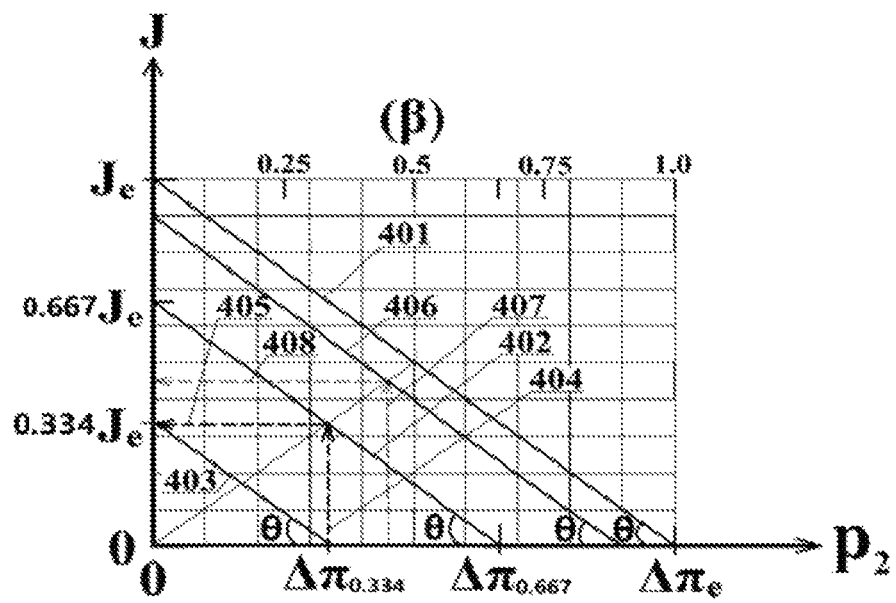
FIG. 4A shows an example of the relationship between effective osmotic pressure differential at different values of $\beta$ and corresponding unit permeate flux in the present invention.

Numerous tests have shown that the quantity of the unit permeate flux J is directly proportional to that of the apparent effective osmotic pressure differential, $\Delta\pi_\beta$, as shown in FIG. 4A. When $\beta$ is equal to 1, $\Delta\pi_\beta$, is equal to the maximum effective osmotic pressure differential, $\Delta\pi_e$, as shown in FIG. 4A. The curve 401 (i.e., the curve of relationship between draw solution input hydraulic pressure $p_2$ vs unit permeate flux J) can be plotted, with a slop $\tan\theta$, where, $\tan\theta=J_e/\Delta\pi_e$, and $J_e$ is the maximum unit permeate flux corresponding $\Delta\pi_e$ obtained from tests. Numerous tests conducted in the past have verified that the curve 401 is approaching to a straight line. When $\beta$ is less than 1, such as curve 402 at $\beta=0.667$ (i.e., the curve of relationship between draw solution input hydraulic pressure $p_2$ at $\Delta\pi_{0.667}$ vs unit permeate flux J at $0.667J_e$), the curve is also approaching to a straight line with a same slop $\tan\theta$, as shown in FIG. 4A. Experiments have shown that, as long as the same osmotic module (or more specifically, same semipermeable membrane with same surface area) is used for different $\beta$ values, the curves of J vs $p_2$ will have the similar slope $\tan\theta=J_e/\Delta\pi_e$. Means, all of the curves of J vs $p_2$ shown in FIG. 4A are straight parallel lines, such as curve 403 at $\beta=0.334$ or curve 406 at $\beta=0.9$. These curves also show that selection of a higher $p_2$ will produce a higher permeate flux $Q_1$, where, $Q_1=JA$ shown in Equation (3). From Equation (6), it is also showed that the higher the $\beta$ selected the higher the $\Delta\pi_\beta$ pressure will be obtained. A higher $\beta$ value also means a higher $Q_2/Q_1$ ratio based on Equation (5), and a higher $p2$ based on FIG. 4A. These relationships can be also seen comparing corresponding data of 404 vs 405, 407 vs 408 in FIG. 4A. As a result, increase of hydraulic pressure $p_2$ value will end up increase of all $Q_1$, $Q_2$, and $\Delta\pi_\beta$ values. Based on Equation (9), the maximum power $W_{max}$ output will be greatly enhanced when all $Q_1$, $Q_2$, and $\Delta\pi_\beta$ values are simultaneously increased. Therefore, PEO module as shown above can greatly enhance the power generation comparing to that of PRO module, with the same area of the same type of semipermeable membrane used.

The significance of PEO concept in osmotic power generation can be further evaluated on the following examples. Evaluation between PEO and PRO is compared based on the same maximum osmotic pressure differential $\Delta\pi_o=26$ atm for freshwater vs seawater, same type and same area of semipermeable membrane in the osmotic module (i.e., same $Je/\Delta\pi_e$ slope), and assuming the same membrane efficiency $\alpha=95\%$:

(1) Maximum Power Generation in a PRO Module:

As shown in FIG. 4A, assuming $\beta=0.667$ is selected (the highest $\beta$ value allowed for PRO by S. Loeb) for evaluation. At the above listed conditions, the effective osmotic pressure differential, i.e., $\Delta\pi_{0.667}=\alpha\beta$ $\Delta\pi_o=0.95\times0.667\times26$ atm=16.47 atm. For obtaining $W_{max}$, $p_2=16.47$ atm/2=8.24 atm. In this evaluation, $Q_1=10$ l/sec (the Statkraft Osmotic Plant design data) of permeate flux is selected. The corresponding $Q_2$ at $0=0.667$ can be calculated from Equation (5), i.e., $Q_2=20$ l/sec. The total $W_{max}$ can then be calculated for the PRO osmotic module, i.e., $W_{max}=8.24$ atm$\times10.33$ m$\times(10$ l/sec+20 l/sec)$\times9.81$ m/sec$^2=25$ kw.

(2) Maximum Power Generation in a PEO Module:

Using the same assumptions as above, but the $\Delta\pi_\beta$ is enhanced in the PEO module, say select $0=0.95$ for comparison. At this condition $\Delta\pi_{0.95}=\alpha\beta$ $\Delta\pi_o=0.95\times0.95\times26$ atm=23.47 atm. For obtaining $W_{max}$, $p_2=23.47$ atm/2=11.74 atm. The J value at this effective osmotic pressure differential can be estimated from FIG. 4A, i.e., $Q_1=(0.95/2)$ $J_e/0.334J_e\times10$ l/sec=14.22 l/sec. Based on Equation (5), $Q_2=(0.95\times14.22)/(1-0.95)=270.18$ l/sec. The total theoretical $W_{max}=11.74$ atm$\times10.33\times(14.22$ l/sec+270.18 l/sec)$\times9.81$ m/sec$^2=338.35$ kw.

(3) Comparison of $W_{max}$ Generated Between PRO and PEO Modules:

The above evaluation verifies that when hydraulic pressure $p_2$ is enhanced, or when a higher $\beta$ value is selected by the PEO method, the theoretical maximum power generation from an osmotic module can be greatly increased. Based on the PRO design parameters used at the Statkraft Osmotic Plant, the total theoretical $W_{max}$ can be generated from the osmotic module is only 25 kw. However, for the same osmotic module, if the PEO concept is applied, the total theoretical $W_{max}$ can be greatly increased to 338.35 kw, about 13.5 times more power can be generated! If PEO concept is used for the Statkraft Osmotic Plant the current nonprofitable plant can turn around to generate a sizable profit even without the need to modify current osmotic module.

Figure 4B:
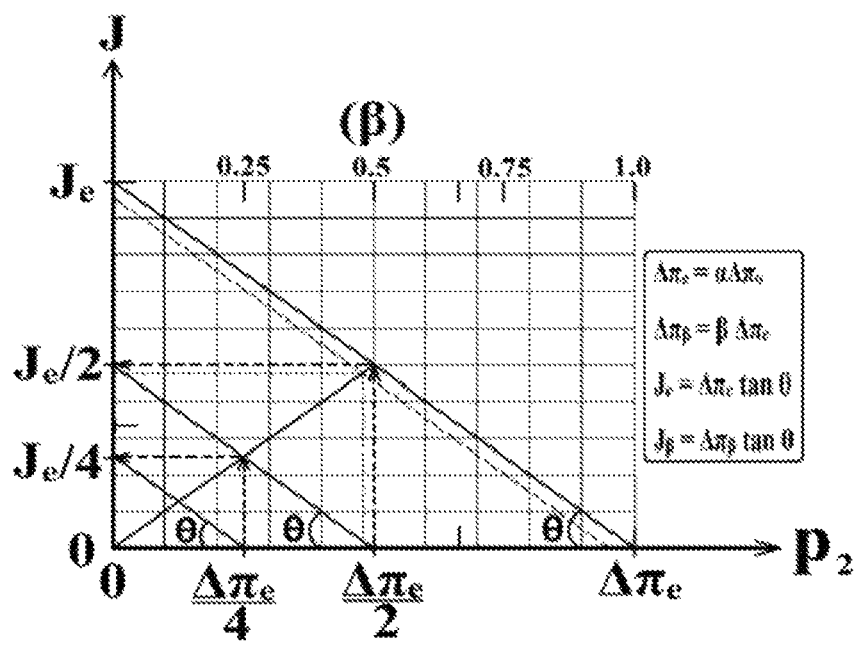
FIG. 4B shows an example of relationship between effective osmotic pressure differential at $\beta=0.25$, 0.5, 1, and corresponding unit permeate flux in the present invention.

(4) Design of a PEO Module:

In a PEO module, stable soluble species (such as inorganic dissolved salts) or suspended particles (such as nano- or micro-particles usually with particle sizes less than 1 µm) in a solvent can be used as draw and feed solutions as long as desirable osmotic pressure can be formed. Using river water and/or treated wastewater vs seawater are advisable for power generation due to their availability and gratis. When the types and available quantities (Q and $Q_2$) of draw and feed solutions are determined and the semipermeable membrane module is selected, relationship of $J_e$ vs $\Delta\pi_e$ as shown in FIG. 4B can be determined. $\Delta\pi_o$'s are calculated by Equations (1) and (2) and the membrane efficiency a can be estimated by experiments or obtained from the membrane supplier. Based on these data, $\beta$ can be selected for the $\Delta\pi_\beta$ calculation. The PEO method requires the selection of $\beta$ as high as possible to enhance the power generation. The suitable range of $\beta$ value is 0.85 to 0.95, and more favorable range is 0.9 to 0.95. Equations (1) to (4) are used for $\Delta\pi_e$ calculation. Based on selected $\beta$ and $\Delta\pi_e$ the effective osmotic pressure differential $\Delta\pi_\beta$ can be identified by Equation (6). Based on the selected steady-state and continuous flux of $Q_2$, the selected $\beta$, and the membrane unit permeate flux data obtained by experiment or supply by the membrane supplier, calculating membrane area requirement and permeate flux $Q_1$ can be performed. The theoretical maximum power $W_{max}$ of the PEO module can then be estimated. As a conclusion, the steps for the PEO module design comprise: (1) applying a pressure-enhanced osmosis (PEO) module as a forward osmosis module and controlling the module to a steady-state and continuous flow condition for the input of the draw and feed solution fluxes as well as generation of the permeate flux, (2) selecting a dilution factor $\beta$ for the PEO module in a range of 0.85 to 0.95, wherein $\beta=Q_2/(Q_1+Q_2)$, $Q_1$ is a permeate flux, and $Q_2$ is an input draw solution flux, (3) selecting either $Q_1$ or $Q_2$ based on available supply, when $Q_1$ is selected the other $Q_2$ can be estimated from the equation listed in step (2) above, vice versa, (4) introducing the draw solution to the draw solution compartment of the forward osmosis module at a hydraulic pressure $p_2$, wherein $p_2=\frac{1}{2}\alpha\beta\Delta\pi_o$, $\alpha$ is membrane efficiency factor representing an efficiency of pressure loss across the semipermeable membrane of the PEO module, and $\Delta\pi_o$ is theoretical maximum osmotic pressure differential of the PEO module, (5) identifying the total required membrane area A, wherein $A=Q_1/(\frac{1}{2}\beta Je)$, $J_e$ is the membrane unit permeate flux at $\Delta\pi_e$ obtained by experiment or supply by the membrane supplier, $\Delta\pi_e$ is the maximum effective osmotic pressure differential which $\Delta\pi_e = \alpha\Delta\pi_o$, and (6) generating energy by the PEO module with a theoretical maximum power output of $W_{max}$, wherein $W_{max} = p_2 (Q_1+Q_2)$.

3. Comparisons of Osmotic System Between PEO of the Present Invention and PRO for Power Generation As discussed above and shown in FIG. 3A, the conventional PRO system only can apply portion of the pressurized mixed solution output 3115 for power generation due to the requirement of pressure for the pressure exchanger 3111. Therefore, the available flux (i.e., $Q_1$) for the turbine 3118 contains only about ⅓ of the power generated from the PRO osmotic module when the conditions of the Statkraft Osmotic Plant (where the maximum β=0.667 allowed by S. Loeb) is concerned. For a PRO power plant selecting β≤0.667, the portion of flux available for power generation would be even smaller. In addition to the above power loss from the PRO module, certain quantity of energy generated by the PRO module is still needed to compensate the energy loss caused by the pressure exchange operation. As a result, only a relatively small portion of energy produced by the PRO module is available to generate net power by the PRO system. Another potential problem without providing solution by the PRO system is the control of a steady-state continuous flow in the draw solution compartment. It is possible that when the pressure differential in the draw solution compartment is exceeding to the selected $p_2$ value, the $Q_2$ flux could be stopped so the entire power generation system may fail.

In order to solve the above-mentioned large energy loss by the PRO pressure exchange operation, a separate pressure stream without the need to consume the power generated by the osmotic module is proposed in the PEO system. In the PEO system two types of naturally occurring pressure stream as the pressure source of $p_2$ are proposed through synergistic effects as will be further discussed later in this document. Solution for maintaining the steady-state continuous flow in the draw solution compartment also can be done by combined actions of the pressure relief and check valves as shown below.

Two types of PEO system are provided in the present invention: surficial (FIG. 3C) and subsurface systems, and the subsurface system is further dividing into submarine (FIG. 3B) and underground (FIG. 3D) systems. Both surficial and subsurface systems of the present invention can utilize all fluxes produced in the PEO draw solution compartment for power generation.

The PEO surficial system is used for further maximizing and simultaneously extraction of osmotic energy from the PEO module or from any forward osmosis energy generation modules.

Figure 3B:
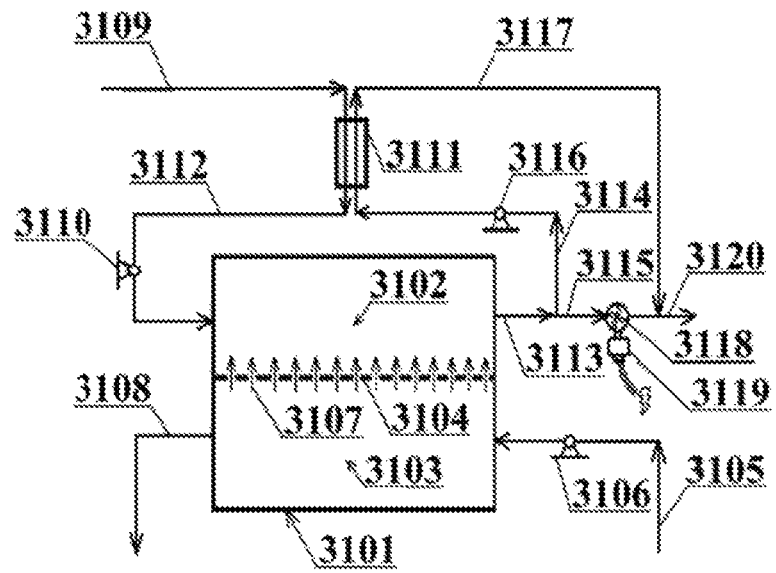
FIG. 3B shows the submarine PEO system with synergistic effects in the present invention.
Figure 3B:
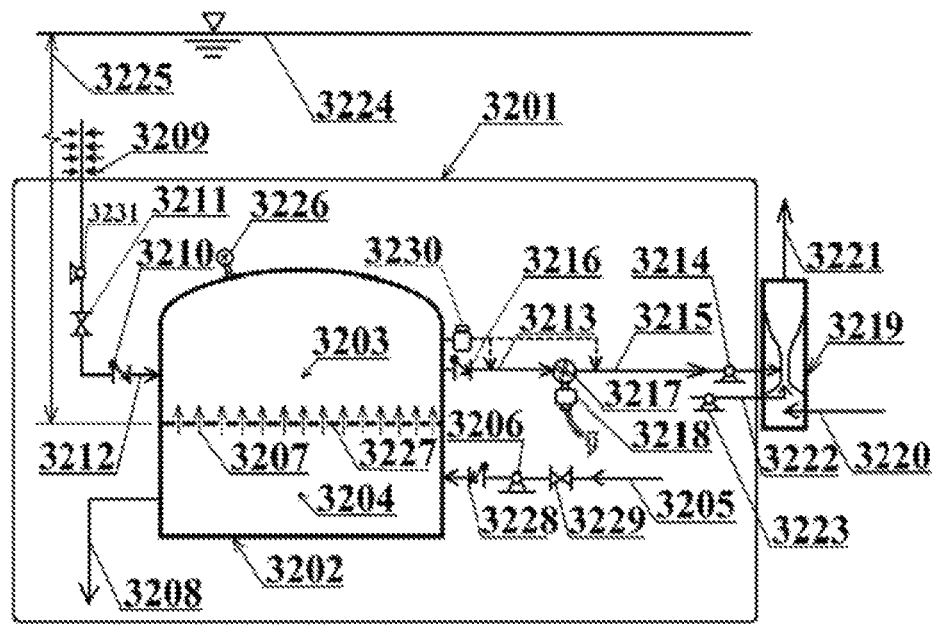
Figure 3C:
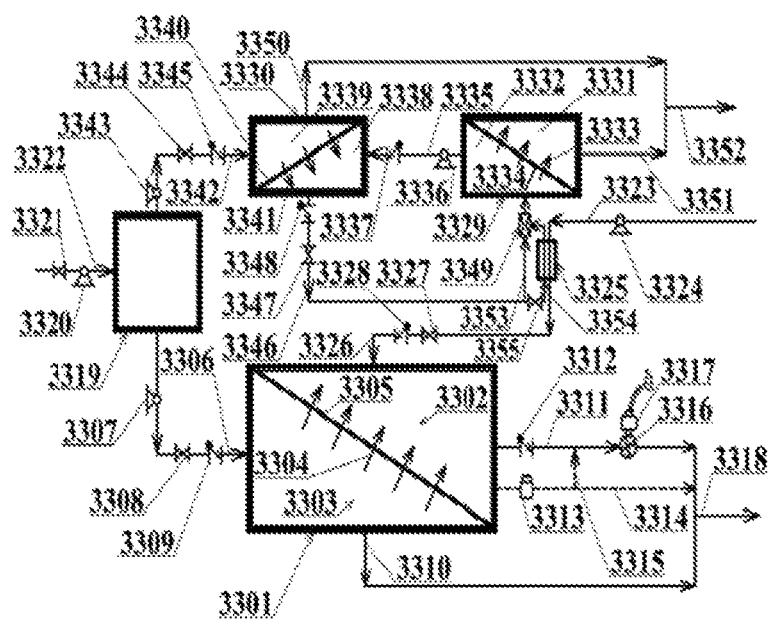
FIG. 3C shows the surficial PEO system with synergistic effects in the present invention.

As shown in FIG. 3C, the PEO surficial system of the present invention can be located above ground with a main PEO FO module 3301 to generate the pressurized mixed solution output flow 3311 (with fluxes $Q_1+Q_2$) by the draw solution compartment 3302 for power generation. The source of draw solution input flow 3326 (with flux $Q_2$ and pressure $p_2$) can be from seawater or natural source of high concentration brine such as from a high-salt lake water if with abundant supply. These sources of draw solution 3323 can be withdrawn by a pump 3324 and adjusted by a pressure exchanger 3325 to a pressure $p_2$ designed by an extra energy generating unit comprising a synergistic FO module 3330, a nanofiltration unit (NF) or an ultrafiltration unit (UF) 3329 and an energy exchange and fluid recovery device as will be discussed in FIG. 6B later in this document. A control valve 3327 is provided to adjust the flux of the draw solution input flow 3326 to a design flux of $Q_2$. A check valve 3328 is provided to prevent backflow from the draw solution compartment 3302. A feed solution input flow 3306 is pumped into the feed solution compartment 3303 by a pump 3307, and again providing a control valve 3308 to adjust input flux to a design flux Q, and providing a check valve 3309 to prevent backflow. The source of feed solution input flow 3322 can be from a river water or treated wastewater, bringing in by a pump 3320 and control valve 3321. A water purification unit 3319 is provided for necessary removal of insoluble solids. A FO membrane 3305 is provided in the PEO FO module 3301 to generate permeate flow 3304 with a flux $Q_1$. The feed solution output flow 3310 is disposed. In order to control the PEO FO module 3301 into a steady-state continuous flow unit, a pressure relief valve 3313 and a check valve 3312 are provided. The pressure relief flow 3314 can be disposed, or the pressure relief flow 3315 can be injected into the pressurized mixed output flow 3311 for power generation. Power generation is operated by a turbine 3316 and a generator 3317. The combined mixed solution 3318 is discharged.

In the PEO surficial system of the present invention, an NF unit or an UF unit 3329 in combination with a synergistic FO module 3330 are used to generate a pressurized mixed solution output flow 3346 for two purposes: one is to provide a pressurized flow 3354 (with a flux $Q_4$) for the pressure exchange operation to produce $p_2$ for the PEO FO module 3301 with a control valve 3355, and the other is to provide a pressurized flow 3353 (for simplicity of operation this flux can be selected at $Q_3$) for re-concentration of the recycled draw solution 3335 through an NF or a UF unit with membrane 3334 in the osmotic unit 3329. Selection of an NF or a UF for the osmotic unit 3329 is based on the particle sizes of the recycled draw solution 3335 used in the pressurized compartment 3332. Selection of the type of the recycled draw solution 3335 is based on the criteria of solute stability, solubility/suspensibility, and possibility of secondary pollution potential when discharged. In the present invention, any of stable soluble inorganic salts of chloride, sulfate, or nitrate of magnesium and calcium, or stable nanoparticles in the particle size range of 1 nm to 1000 nm or their combinations are selected. If soluble inorganic salts are selected, the NF unit can be used for the osmotic unit 3329. However, when nanoparticle solution is selected either NF or UF can be used depending on the particle size ranges in the recycled draw solution 3335. When the particle sizes are in the 1 to 5 nm range an NF unit can be used, and when they are in the 5 to 1000 nm range a UF unit can be used. The favorable particle range is 5 to 500 nm, and most favorable range is 10 to 50 nm. Selection of nanoparticle is more favorable than soluble salts due to easiness and energy savings for re-concentration by the osmotic unit 3329. Favorable nanoparticles include silicon dioxide, titanium dioxide, nano-silicon crystal, nano-titanium particle, nano-clay minerals, nontoxic metallic oxides or combinations of above. A permeate flow 3333 (selection at flux $Q_4$) is produced in the filtered solution compartment 3331 after re-concentration operation. The filtered output flow 3351 is disposed or recycled. Through pressure exchange operation, the pressurized flow 3354 (to simply the operation this flux can be selected at $Q_4$) is de-pressurized, and can be injected into the pressurized flow 3353 by a venturi injector 3349 for the solute particle removal. The structure of FO unit 3330 is similar to that of PEO FO unit 3301, containing necessary draw solution compartment 3338, feed solution compartment 3339, and FO membrane 3340 to produce permeate flow 3341 to create a flux $Q_4$. Similar to that of FO unit 3301, pumps 3336 and 3343, check valves 3337, 3345 and 3348, as well as control valves 3344 and 3347 are provided. The feed solution input flow 3342 is provided from the same water purification unit 3319, and feed solution output flow 3350 can be reused as feed solution or is mixed with filtered output flow 3351 to form mixed solution 3352 for discharge or recycle. In the FO unit 3330 a much higher concentration of a draw solution 3335 is used to generate enough energy to provide $p_2 \times Q_2$ and energy needed for re-concentration in the osmotic module 3329, as will be further discussed later in this document.

In the PEO submarine system of the present invention (FIG. 3B), a PEO FO module 3202 is located in a submarine structure 3201. A feed solution input 3205 (such as a river water or a treated wastewater) with a flux Q is pumping into the feed solution compartment 3204 by a pump 3206, a control valve 3229, and a check valve 3228. A draw solution input 3212 (such as a seawater) with a flux $Q_2$ is withdrawing into the draw solution compartment 3203 controlling by a pump 3231 and a control valve 3211 maintaining at a hydraulic pressure of $p_2$. The hydraulic pressure $p_2$ is generated naturally through synergistic effects by the hydraulic head 3225 below the seawater surface 3224. For the control of a steady-state continuous flow in the draw solution compartment, check valves 3210, 3216, a pressure gage 3226, a pressure relief valve 3230 are provided. The permeate flow 3207 with a flux $Q_1$ is formed through an FO semipermeable membrane 3227. The draw solution 3212 is withdrawn from a seawater intake with filter 3209 and the feed solution output 3208 is discharged to an uplifting chamber 3219 or into a reservoir (not shown) for recycling. In this PEO design the pressurized mixed solution output 3213 with flux of $Q_1+Q_2$ can be retrieved for energy generation with a combination of a turbine 3217 and a generator 3218. The pressure released flow 3215 is discharged to the uplifting chamber 3219 with a pump 3214 when necessary. The uplifting chamber 3219 (details shown in FIG. 6A) is proposed with synergistic effects of a pressurized seawater input flow 3220, a sparging air flow 3222 by a air pump 3223, a diluted (lower density) and heat exchanged (not shown) pressure released flow 3215 to discharge the mixed solution output flow 3221. As will be further discussed later, the proposed uplifting chamber can greatly reduce the pressure requirement for the discharge of unwanted flows.

In the PEO underground system of the present invention (FIG. 3D), a PEO FO module 3401 is located in an underground structure 3400 with a depth not less than the hydraulic head of $p_2$. A feed solution input flow 3406 with a flux Q is pumping into the feed solution compartment 3403 by a pump 3407, a control valve 3408, and a check valve 3409. A draw solution input 3424 (such as a seawater) with a flux $Q_2$ is withdrawing into the draw solution compartment 3402 controlling by a pump (not shown) and a control valve 3425 maintaining at a hydraulic pressure of $p_2$. The hydraulic pressure $p_2$ is generated naturally through synergistic effects by the hydraulic head 3433 below the seawater or a brine lake water surface 3432. For the control of a steady-state continuous flow in the draw solution compartment 3402, check valves 3412, 3426, a pressure relief valve 3413 are provided. The permeate flow 3404 with a flux $Q_1$ is formed through an FO semipermeable membrane 3405. The draw solution 3424 is withdrawn from a seawater intake with filter 3423 and the feed solution output 3410 is discharged to an uplifting chamber 3439 or into a reservoir (not shown) for recycling. In the PEO system of the present invention the pressurized mixed solution output flow 3411 with flux of $Q_1+Q_2$ can be retrieved for energy generation with a combination of a turbine 3416 and a generator 3417. The pressure released flow 3418 is discharged to the uplifting chamber 3439 with a pump 3434 when necessary. The uplifting chamber 3439 (details shown in FIG. 6A) is proposed with synergistic effects of a pressurized seawater input flow 3438, a sparging air flow 3437 by an air pump 3436, a diluted (lower density) and heat exchanged (not shown) pressure released flow 3435 to discharge the mixed solution output flow 3440. The uplifting chamber 3439 in the present invention can greatly reduce the pressure requirement for the discharge of unwanted flows. The source of the input water 3422 (such as a river water or a treated wastewater) is bringing into a water purification unit 2419 by a pump 3420 and a control valve 3421. In order to control the FO unit 3401 into a steady-state continuous flow unit, a pressure relief valve 3413 and a check valve 3412 are provided. The pressure relief flow 3414 can be disposed, or the pressure relief flow 3415 can be injected into the pressurized mixed output flow 3411 for power generation. Both the submarine and underground PEO systems usually require to be constructed deep enough so the pressure of $p_2$ can be naturally provided without extra energy needed. Depths required for both submarine and underground PEO systems are enough to construct another freshwater hydropower plant in the present invention (not shown in FIG. 3B but shown in FIGS. 3D, 1A, and 1B). The hydraulic head of the hydropower plant in both systems could be greater than that of the Yangtze River Three-Gorge Power Plant! In FIG. 3D, a penstock 3427 from the ground surface 3431 can be installed and a turbine 3428 and a generator 3429 can be provided for power generation. The pressure relief flow can be drained to an equalization tank 3430 for the feed solution need of the PEO FO unit 3401.

One of major differences between the PRO system and PEO system in the present invention is the use of energy generated by the osmotic module for power generation. In the PRO system only the energy of $p_2 \times Q_1$ is used for power generation, however, in the PEO system all energy (i.e., $p_2 \times (Q_1+Q_2)$) generated by the osmotic module can be used for power generation. The maximum power $W_{max}$ can be generated from the PRO system is as follows:

$$W_{max)PRO} = (\tfrac{1}{2}\Delta\pi_\beta) \times (\tfrac{1}{2}J_\beta A)$$

$$= (\tfrac{1}{2}\beta\Delta\pi_e) \times (\tfrac{1}{2}J_\beta A) \quad (10)$$

However, the maximum power $W_{max}$ can be generated from the PEO system is as follows:

$$W_{max)PEO} = (\tfrac{1}{2}\beta\Delta\pi_e) \times (\tfrac{1}{2}J_\beta A + Q_2)$$

$$= (\tfrac{1}{2}\beta\Delta\pi_e) \times \{\tfrac{1}{2}J_\beta A + [\beta/(1-\beta) \times Q_1]\}$$

$$= (\tfrac{1}{2}\beta\Delta\pi_e) \times \{\tfrac{1}{2}J_\beta A + [\beta/(1-\beta) \times \tfrac{1}{2}J_\beta A]\}$$

$$= (\tfrac{1}{2}\beta\Delta\pi_e) \times \{\tfrac{1}{2}J_\beta A \times [1/(1-\beta)]\} \quad (11)$$

Where the β value for the PRO system is less than 0.667, but for the PEO system greater than 0.85 of β is usually selected. If the same data as the above osmotic module example (i.e., α=95%, β are 0.667 vs 0.95, $Q_1$ and $Q_2$ of the Statkraft Osmotic Plant) are selected for comparison, the theoretical $W_{max}$ available from the PRO and PEO systems are:

$$W_{max)PRO} = (\tfrac{1}{2} \times 0.95 \times 0.667 \times 26 \text{ atm}) \times (\tfrac{1}{2} J_\beta A)$$

$$= 8.24 \text{ atm} \times 10.33 \text{ m} \times 10 \text{ l/sec} \times 9.81 \text{ m/sec}^2 = 8.35 \text{ kw}.$$

$$W_{max)PEO} = 11.74 \text{ atm} \times 10.33 \times (14.22 \text{ l/sec} + 270.18 \text{ l/sec}) \times 9.81 \text{ m/sec}^2 = 338.35 \text{ kw}.$$

The above data show that with the above assumptions of conditions, $W_{max)PEO}$ is 338.35/8.35=40.5 times higher than $W_{max)PRO}$. The situation implies that about 40 equivalent Statkraft Osmotic Plants of maximum power can be generated by using the PEO method comparing to that using the PRO method which can generate only one equivalent of maximum power from the same Statkraft Osmotic Plant. Therefore, the improvement of maximum power generation by the PEO system vs the PRO system is enormous. Some of the previous cases using the PRO system to generate power are selected for comparisons with that of the PEO system, as shown in Table 2 below:

TABLE 2

Comparisons of Power Generation by PEO System vs PRO System*

| Case | Comparison | | Source | $Q_1$ (m3/s) | $Q_2$ (m3/s) | β | $\Delta\pi_\beta$ (atm) | $P_2$ (atm) | $P_2$ (m) | W (kw) |
|---|---|---|---|---|---|---|---|---|---|---|
| 1 | PRO System | Loeb Sidney | US3906250 (1975) | 0.60 | 1.00 | 0.63 | 15.11 | 10.00 | 103.3 | 334 |
|   | PRO @ $W_{max}$ | Achilli, et. al | J. Membrane Sci. 343 (2009) | 0.89 | 1.48 | 0.63 | 15.11 | 7.56 | 78.06 | 373 |
|   | PEO System | James Lu | This Invention | 1.28 | 11.49 | 0.90 | 21.76 | 10.88 | 112.40 | 7744 |
| 2 | PRO System | Loeb Sidney | J. Membrane Sci. 51(1990) | 1.00 | 1.08 | 0.52 | 13.81 | 9.00 | 92.97 | 502 |
|   | PRO @ $W_{max}$ | Achilli, et. al | J. Membrane Sci. 343 (2009) | 1.44 | 1.55 | 0.52 | 13.81 | 6.91 | 71.34 | 552 |
|   | PEO System | James Lu | This Invention | 2.49 | 22.39 | 0.90 | 23.94 | 11.97 | 123.65 | 16597 |
| 3 | PRO System | Loeb Sidney | Desalination 143 (2002) | 23.15 | 57.88 | 0.71 | 16.96 | 12.00 | 123.96 | 15483 |
|   | PRO @ $W_{max}$ | Achilli, et. al | J. Membrane Sci. 343 (2009) | 39.55 | 98.89 | 0.71 | 16.96 | 8.48 | 87.62 | 18699 |
|   | PEO System | James Lu | This Invention | 49.84 | 448.5 | 0.90 | 21.38 | 10.69 | 110.40 | 296858 |
| 4 | PRO System | Statkraft | Statkraft Osmotic PRO Plant | 0.01 | 0.02 | 0.67 | 16.47 | 12.50 | 129.13 | 6.97 |
|   | PRO @ $W_{max}$ | Achilli, et. al | J. Membrane Sci. 343 (2009) | 0.02 | 0.04 | 0.67 | 16.47 | 8.23 | 85.05 | 9.52 |
|   | PEO System | James Lu | This Invention | 0.03 | 0.25 | 0.90 | 22.23 | 11.12 | 114.82 | 174 |
| 5 | PRO @ $W_{max}$ | Achilli, et. al | J. Membrane Sci. 343 (2009) | 23.15 | 208.4 | 0.90 | 22.23 | 11.12 | 114.82 | 14341 |
|   | PEO System | James Lu | This Invention | 23.15 | 208.4 | 0.90 | 22.23 | 11.12 | 114.82 | 143414 |

*Comparisons for Table 2 are based on assumptions: α = 93% for Case 1 & 95% for all other cases; $\Delta\pi_o$ = 26 atm for Cases 1, 4 & 5, 28 atm for Case 2, 25 atm for Case 3; 55% power generation (turbine + generator) efficiency; energy needed for pressure exchange for all PRO cases is not deducted; $Q_1$, $Q_2$, & β are from related PRO systems discussed in the literature; selection of β = 0.9 for all PEO systems.

4. PEO System and Synergistic Effects

The capability of the PEO system in the present invention may be achieved and improved by synergistic effects. The major synergistic effects in the present invention include: (1) steady and continuous supply of naturally available extra energy for $p_2$ and $Q_2$ which will not consume energy generated by the PEO system of the present invention, (2) application of heat generated from turbine/generator to increase power generation and discharge of waste process saltwater, (3) application of effects for water diversion, discharge, or recycling from low pressure to high pressure conditions, (4) synergistic effects between hydropower and osmotic power plants, and (5) synergistic effects for maintaining steady-state continuous flow and preventing of reflux. The synergistic effects are further explained as follows.

Figure 1A:
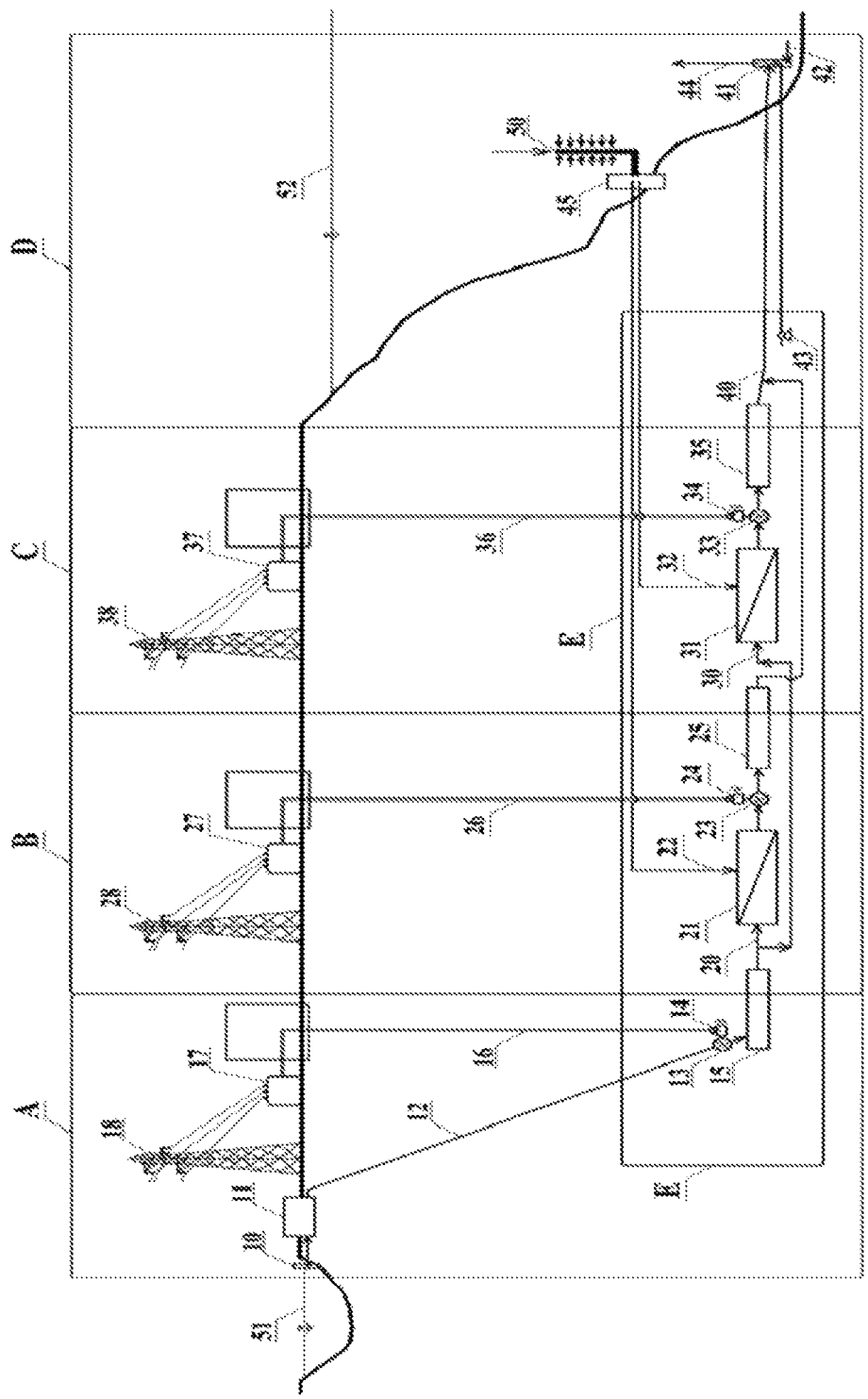
FIG. 1A shows a series of underground power generation plants near an estuary by Pressure-Enhanced Osmosis and synergistic effects in the present invention.
Figure 1B:
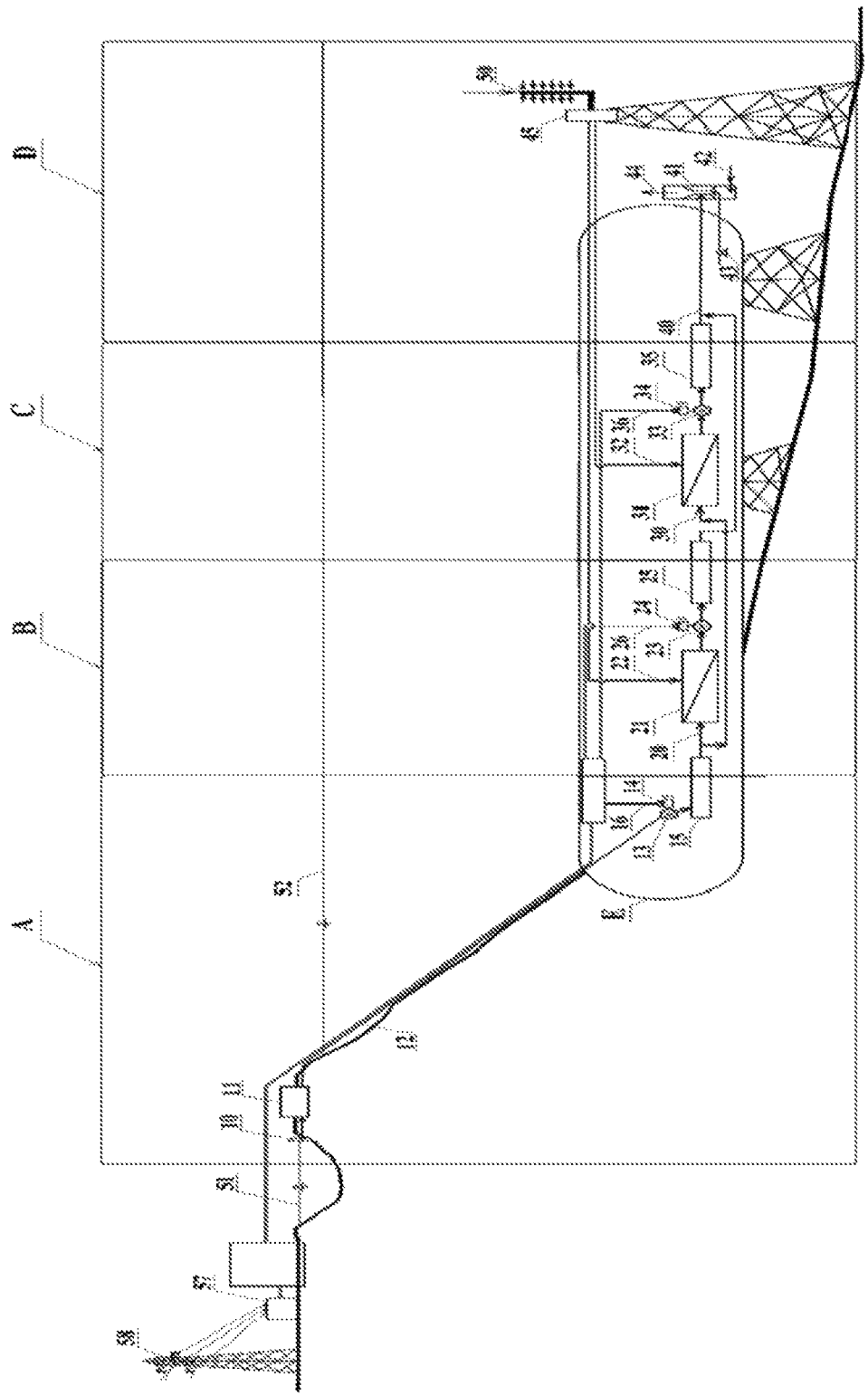
FIG. 1B shows a series of submarine power generation plants by Pressure-Enhanced Osmosis and synergistic effects in the present invention.
Figure 3D:
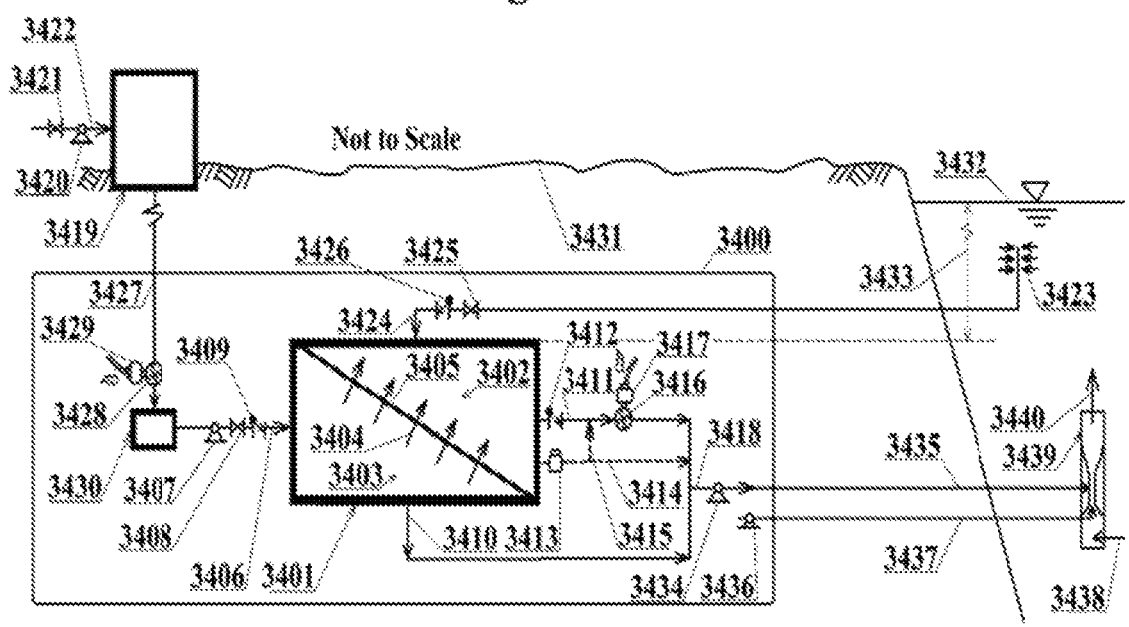
FIG. 3D shows the underground PEO system with synergistic effects in the present invention.

(1) Naturally Available Energy for $p_2$ and $Q_2$:

In the present invention, the two types of systems using the naturally available energy are proposed, one is the surficial PEO system using combination of FO and NF units or FO and UF units as shown in FIG. 3C, and the other is the subsurface PEO system using gravitational potential (hydraulic head) as shown in FIGS. 3B and 3D, also shown in FIGS. 1A and 1B. Comparing the two types of naturally available extra energy, advantages of the surficial system is that it can be located on the ground surface anywhere draw and feed solutions are available, and it also can lower costs for constructing the PEO osmotic unit above ground. The draw solution used in the surficial PEO unit to generate $Q_3$ also can be automatically re-concentrated and reused. However, advantages for the subsurface PEO systems of the present invention are without the need for constructing and operating additional above ground plant to generate $p_3$ and bring in draw solution $Q_3$. In the situation, if seawater or lake brine is used as the draw solution for the subsurface systems and if in combination with freshwater (i.e., river water or treated wastewater) as the feed solution supply, the draw solution itself can be used to maintain $p_2$ pressure for $Q_2$. An additional hydropower plant can also be built for extra energy harvesting in addition to apply osmotic power plants in the subsurface environment.

For the surficial PEO system of the present invention, a much higher concentration of draw solution $Q_3$ in the FO unit 3330 than that used for the PEO module 3301 shall be used so extra energy is available for the PEO module 3301. As discussed and shown in FIG. 3C regarding the surficial system, the energy $p_3Q_3$ generated by the FO module 3330 can be used to provide extra energy $p_2Q_2$ for the PEO module 3301. The much higher concentration of $Q_3$ can provide a much higher maximum pressure differential (using the symbol $\Delta\pi_o$) to produce a much higher hydraulic pressure p3, as shown:

$$p3 = \tfrac{1}{2}\Delta\pi_{\beta 3}' = \tfrac{1}{2}\alpha_3\beta_3\Delta\pi_o' \quad (12)$$

where $\alpha_3$ represents the membrane efficiency of FO unit 3330, and $\beta_3$ is the dilution factor from $\beta_3 = Q_3/(Q_3+Q_4)$. If η representing combined efficiencies of the energy exchanger 3325, fluid recovery device 3349, and other associated pump and piping friction pressure losses, p representing pressure used to bring in draw solution 3323 at flux $Q_2$, $\alpha_2$ representing membrane efficiency of osmotic unit 3329, and applying related equations discussed previously, the following equations can be derived to represent minimum $Q_3$ and $Q_4$ needed:

$$Q_3 \geq \{[\tfrac{1}{2}\alpha\beta(1+\eta)\Delta\pi_o - p]\beta_3 Q_2\}/\{\alpha_3\beta_3(1-\beta_3)[\tfrac{1}{2}-\tfrac{1}{2}(1-\alpha_2+\eta)]\Delta\pi_o'\} \quad (13)$$

$$Q_4 = [(1-\beta_3)/\beta_3] Q_3 \quad (14)$$

For example, when $\Delta\pi_o' = 2\,\Delta\pi_o$ is chosen, in order to provide PEO module 3301 with $p_2 Q_2$ the minimum $p_3 Q_3$ and $Q_4$ needed based on the above Equations (12), (13) and (14), with assumptions of $\alpha=95\%$, $\beta=0.9$, $\alpha_2=97\%$, $\alpha_3=95\%$, $\beta_3=0.95$, p=1 atm, $\Delta\pi_o=26$ atm, and $\eta=5\%$, the following data can be calculated: $Q_3 \geq 9.39 Q_2$, $p_3=23.47$ atm, and $Q_4 \geq 0.49 Q_2$. If the above data are selected, module units 3329 and 3330 of the surficial PEO system can be operating continuously at a steady-state condition. Another example, if at an even higher $\Delta\pi_o'$ is chosen (say, $\Delta\pi_o' = 4\,\Delta\pi_o$), and at the above same assumptions, the following data can be calculated: $Q_3 \geq 4.70 Q_2$, $p_3=46.93$ atm, and $Q_4 \geq 0.25 Q_2$. Above data show that when a higher $\Delta\pi_o'$ is choosing, flux requirements of $Q_3$ and $Q_4$ will be reduced, so do the sizes of the osmotic module 3329 and 3330. The situation can reduce the constructing costs of the surficial PEO plant.

For the subsurface PEO systems of the present invention, the naturally available extra energy source can be from the hydraulic head of the seawater (or the brine lake water if it is used as the draw solution), such as hydraulic heads 3225 in FIG. 3B and 3433 in FIG. 3D. No extra osmotic plant needs to be built to supply $p_3$ and $Q_3$ as in the case of the surficial PEO system discussed above. In the situation, the minimum depth of the subsurface power plants shall be built at least equivalent to the p2 hydraulic head depth. Examples are shown in Table 2. If a shallower subsurface plant is to be built, a smaller β value can be selected.

(2) Synergistic Effects by Waste Heat Reuse:

Waste heat will be generated from the power conversion units of turbines and generators in the osmotic power generating systems of the present invention due to relatively low system efficiencies for energy conversion (combined usually only 50 to 60%). Therefore, cooling units are needed for turbines and generators. Through heat exchange the waste heat can be recovered for several purposes, such as increase of the osmotic pressure produced in the osmotic module (i.e., increase of T in Equation (2) above), reduction of the density of process waste streams so it can be more easily discharged through the uplifting chamber (i.e., 3219 in FIG. 3B and 3439 in FIG. 3D) in the subsurface PEO system of the present invention. These synergistic effects for the osmotic power generation plants not only can be used to increase energy quantity generated by the osmotic nodule, more importantly, they also can facilitate the function of the proposed uplifting chamber so the waste process streams in the subsurface structure can be discharged to the high pressure seawater environment more easily.

(3) Synergistic Effects for Accomplishing the Energy Exchange and Fluid Recovery:

In the PEO systems of the present invention, certain low-pressure flows may need to be re-injected into the high-pressure flows for recycling or discharge. The present invention provides a specially designed uplifting chamber (FIG. 6A) and a combination of a energy exchanger with a venturi injector (FIG. 6B) to assist the above conditions.

(4) Synergistic Effects Between Hydropower Plants and Osmotic Power Plants:

Conventional hydropower plants require several key conditions to accomplish, such as requirements of a high hydraulic head, a relatively high-water flux, and a water diversion (discharge) means to drain the water away after the power generation. The subsurface PEO systems of the present invention can provide all the above conditions so an extra hydropower plant can be installed together with the osmotic power plant. The hydraulic head of this extra hydropower plant can be extremely high, with a head close to that of the world largest Yangtze River Three-Gorge Hydropower Plant can easily be arranged. The subsurface PEO system of the present invention also can provide subsurface equalization tanks 15 and 3430, as shown in FIGS. 1A, 1B, and 3D, to divert the pressure relieved water away after power generation.

As shown in FIGS. 1A and 1B, in a subsurface structure E, a hydropower plant A and multiple osmotic power plants (only two power plants B and C are shown in the figures) located near an estuary can be built. A river-water 51 is withdrawn from an intake structure 10 for power generation. A freshwater purification plant 11 can be installed to remove suspended solids. The purified water is then flow through a penstock 12, using turbines 13 and generators 14 to generate hydropower. An equalization tank 15 is provided to divert and hold the process water, so as to use the diverted water as the feed solution for the next several PEO osmotic units to generate more power as shown in power plants B and C in FIGS. 1A and 1B. Multiple osmotic power plants can be built due to high β values are selected in the PEO system. For example, when β=0.9, based on Equation (5), $Q_2$ (the draw solution flux, in this case is the seawater flux) will be nine (9) times of $Q_1$ (the freshwater feed solution flux, in this case is the diversion water flux). The situation means that if the amount of flux is selected at $Q_1$, this flux would be enough to use as the feed water for up to nine osmotic power plants if β=0.9 is selected. The phenomenon implies an incredibly significant synergistic effect, means, applying freshwater-seawater pair can generate an enormous renewable energy if the PEO is used. Consider that, if the same freshwater flux from the Three-Gorge Hydropower Plant flows to the estuary, up to nine times of the power than that of the original upstream hydropower plant can be generated. Installing a hydropower plant in the subsurface PEO system of the present invention would be much easier and may be least costly than that of the conventional hydropower plants which are requiring to construct a high cost dam, a water reservoir, and a power plant locating in a relatively remote mountainous area.

As illustrated in FIGS. 1A and 1B, all the subsurface power plants can transmit power generated through power lines 16, 26, and 36 to electrical substations 17, 27, 37 and 57, and transmit power away through transmission towers 18, 28, 38 and 58. Multiple freshwater (feed solution) input flows 20 and 30, multiple osmotic units 21, and 31, as well as multiple equalization tanks 25 and 35 can be arranged for turbines 23, and 33, and generators 24 and 34. The seawater intake pipe with filter 50 is located below the seawater surface 52 to bring in seawater by the synergistic effect of hydraulic head created naturally by the gravity potential. The seawater serves as the draw solution and can be distributed by a distribution chamber 45. The diluted pressure relieved salt water 40 is discharged into a relatively high-pressure seawater environment through the aid of synergistic effects of the uplifting chamber 41, sparging air created by an air pump 43, and automatic inlet seawater 42. The uplifting flow 44 can be diverted away due to lower density than that of the surrounding seawater created by the sparging air and higher temperature, as well as uplifting flow in the uplifting chamber 41 created by the sparging air and inlet seawater 42.

(5) Synergistic Effects for Maintaining Steady-State Continuous Flow and Preventing Reflux:

Maintaining a steady-state continuous flow is important for the functioning of the draw solution compartment. In the present invention, both check valves and pressure relief valves are provided for the purpose. Check valves can prevent reflux in case the pressure in the osmotic compartments are varied due to any unbalanced flux and hydraulic pressure. A pressure relief valve provided for the draw solution compartment can prevent the higher effective osmotic pressure differential $\Delta\pi_\beta$ than that of the input hydraulic pressure $p_2$, causing the osmotic pressure to unsteady.

Figure 5A:
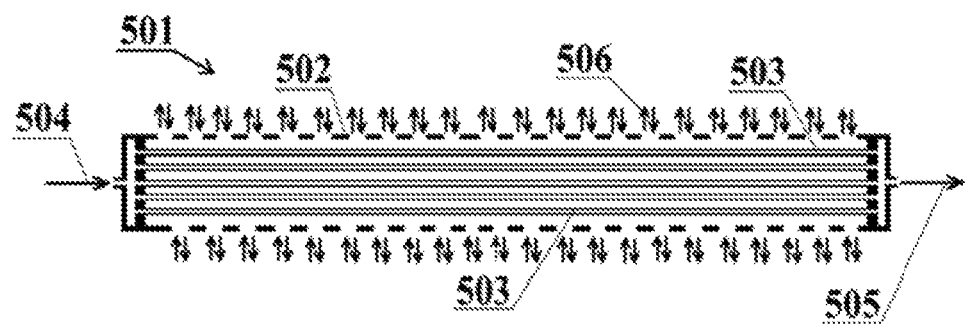
FIG. 5A shows the tubular forward osmosis (FO) module of the present invention.
Figure 5B:
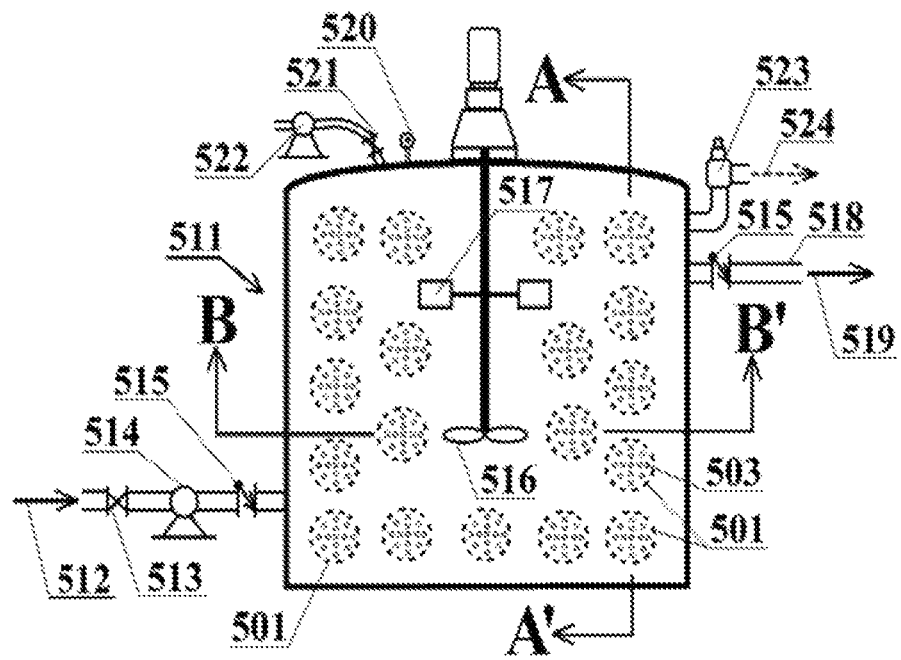
FIG. 5B is a schematic diagram showing an example of the PEO module of the present invention.

5. Osmotic Module, Uplifting Chamber, and Energy Exchange and Fluid Recovery Device of the Present Invention Many basic types of FO osmotic membrane modules are commercially available such as flat sheet tangential flow module, hollow fiber module, spiral wound module, and tubular module. Although all of the above membrane modules can be applied in the PEO system of the present invention, for the easiness of controlling concentration polarization and steady-state flow, a specific design of a PEO module 511 is selected for the PEO system of the present invention as shown in FIG. 5B. The PEO module 511 is formed by a multitude of basic tubular membrane module 501 shown in FIG. 5A. The basic tubular membrane module 501 is modified from the commercially available modules and is comprised of numerous capillary type of FO membrane tubes 503 located inside a porous pipe casing 502. The feed solution inflow 504 is entering inside the tubes from one end of the basic module 501, and the feed solution outflow 505 is leaving from the other side of the basic module, as shown in FIGS. 5A and 5C. The feed solution is diffused through the membrane by a draw solution outside the membrane tubes 503. The permeate exits through the membrane casing openings 506.

As shown in FIG. 5B, a multitude of basic tubular membrane modules 501 are installed in the PEO module 511. The PEO module 511 is a pressure vessel with a stainless-steel housing and with pressure $p_2$ inside the vessel created by the draw solution at a selected β value. The total membrane area needed in each PEO module 511 can be calculated based on $Q_1$ flux generated by the multitude of basic tubular membrane modules 501, which in turn affected by selected β, $\Delta\pi_\beta$, and $Q_2$ data as shown in equations discussed above. The flux of the draw solution inflow 512 is controlled by a control valve 513 with the aid of a pump 514 when necessary. The backflow of the draw solution from the vessel is prevented by a check valve 515. A propeller mixer 516 and a turbine mixer 517 are provided to homogenize the draw solution and reduce the effects of external concentration polarization (ECP). The propeller mixers 516, as shown in FIGS. 5B and 5D, is able to create vertical convective current and the turbine mixer 517 is able to create radial mixing current so the homogenized draw solution and permeate can penetrate in and out through the porous pipe casing 502. The pressurized mixed solution output outflow 519 through a pressurized mixed solution output pipe 518 can combine with outflow from other parallel PEO osmotic modules for power generation. Again, a check valve 515 is provided on the output pipe 518 to prevent any backflow. A pressure relief valve 523 is provided to avoid any vessel pressure beyond the selected $p_2$ level to assist in maintaining the steady-state condition of the pressurized PEO module. The pressurized flow 524, if any, can join the outflow 519 for power generation. A pressure gage 520, a control valve 521, and a control pump 522 are provided for the necessary adjustment of the vessel pressure. More detailed schematic cross-sectional views are provided in FIGS. 5C and 5D.

Figure 6A:
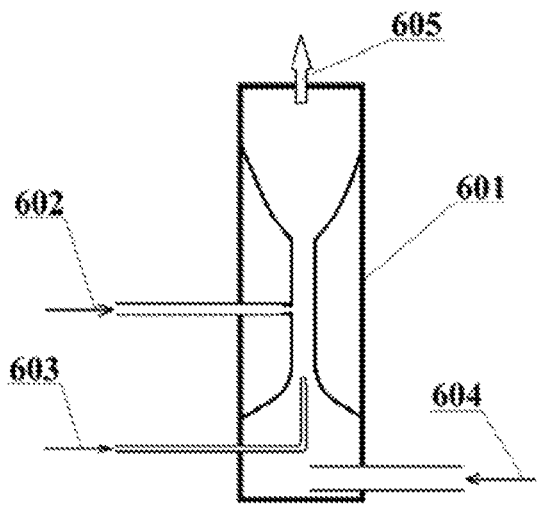
FIG. 6A is a schematic diagram showing an uplifting chamber in the present invention.

A schematic diagram of an uplifting chamber 601 in the present invention is shown in FIG. 6A. The major purpose of the uplifting chamber 601 is to dissipate the pressure released flow 602 into a relative high-pressure seawater environment. The uplifting chamber 601, with a cylindrical stainless-steel housing and a narrow fluid passage in the center, is provided with a sparging air flow 603 to create a fast-flowing uplifting current through a low-pressure passage where the pressure released flow 602 is injected. A relatively higher pressure and higher density seawater inflow 604 is automatically input into the bottom area of the uplifting chamber 601 to assist the dissipation of the pressure released flow 602. The dissipation of the mixed solution outflow 605 also assisted by the lower density of the mixed solution caused by the heat exchange thermal effect discussed above and the diluted draw solution by permeate flow. The uplifting chamber 601 can make the discharge of the pressure released flow becomes possible to avoid the need of high-pressure requirement for discharge of waste process solutions.

Figure 6B:
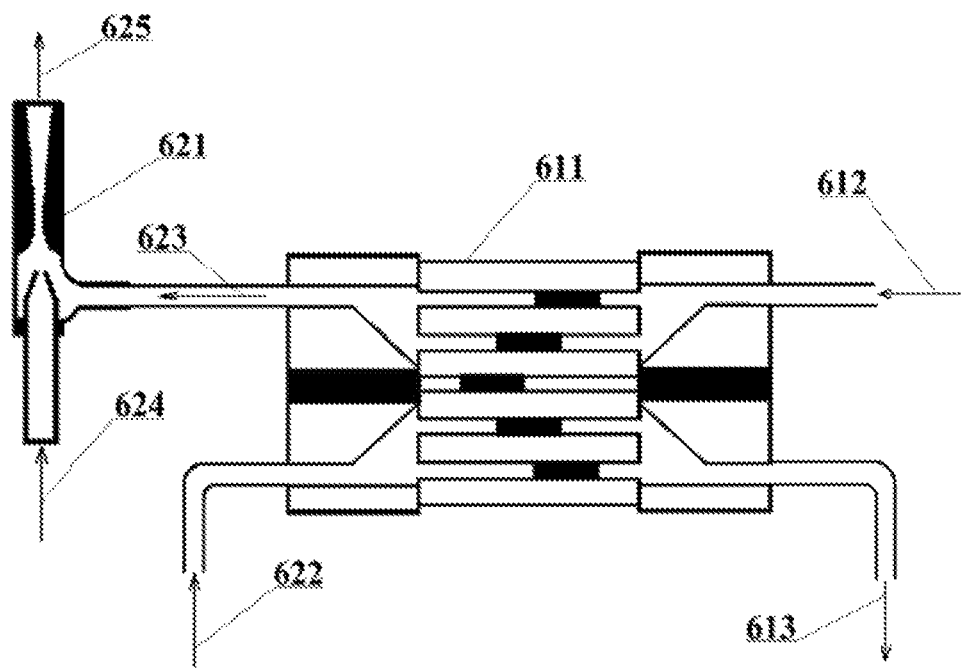
FIG. 6B is a schematic diagram showing an energy exchange and fluid recovery device in the present invention.

A devise showing combination of an energy exchanger 611 and a venturi injector type of fluid recovery device 621 is shown in FIG. 6B. The combined device is able to provide energy necessary to bring in low pressure draw solution (e.g., seawater or other brine) inflow 612, and is also able to recover the pressurized inflow 622 after energy exchange for the surficial PEO system. The pressurized outflow 613 is forming the draw solution with required $p_2$ and $Q_2$ for the surficial PEO FO module 3301 as shown in FIG. 3C. To recover the solutes and/or nanoparticles in the low-pressure outflow 623, a venturi injector type of fluid recovery device 621 is provided. As shown in FIG. 3C, the pressurized output flow 3346 is broken down into two fluids 3353 and 3354, which are pressurized inflows 624, and 622, respectively in FIG. 6B. The high-pressure outflow 625 is formed and then inject into an NF or UF unit 3329 for re-concentration. The combined pressure exchange and fluid recovery device can provide extra natural energy available to enable the surficial PEO system to generate power with all the energy in the pressurized mixed output flow 3311. The arrangement is different from the conventional PRO system for power generation.

Principles, methods and major apparatus are described above to explain the subject invention. It will be apparent to one of ordinary skill in the art that many changes and modifications can be made thereto without departing from the spirit or scope of the appended claims.

I claim:

1. A pressure-enhanced osmosis (PEO) system for maximizing generation of osmotic energy, comprising
  a main PEO forward osmosis module, the main PEO forward osmosis module further comprising a pressurized vessel with a draw solution compartment, a feed solution compartment, and semipermeable membrane being positioned between the draw solution compartment and the feed solution compartment, wherein the draw solution compartment of the main PEO forward osmosis module is being supplied with a draw solution input flow with a dilution factor β in a range of 0.85 to 0.95 for an input draw solution flux $Q_2$, $\beta=Q_2/(Q_1+Q_2)$, $Q_1$ is a permeate flux, and an input hydraulic pressure $p_2=\frac{1}{2}\alpha\beta\Delta\pi_o$, wherein $\alpha$ is a membrane efficiency factor representing a percentage of pressure remaining across the semipermeable membrane, and $\Delta\pi_o$ is a theoretical maximum osmotic pressure differential of the main PEO forward osmosis module, a plurality of tubular membrane modules, the tubular membrane modules further comprising a plurality of porous casing to house the semipermeable membrane in the tubular membrane modules, respectively, for flowing a feed solution inside tubes of the tubular membrane modules and creating the permeate flux $Q_1$, a plurality of mixers, the plurality of mixers further comprising a plurality of combined propeller and turbine blades for homogenizing the input draw solution flux $Q_2$ inside the pressurized vessel and reducing effects of external concentration polarization of the tubular membrane modules, a stainless-steel housing for maintaining constant pressure $p_2$ created by the input draw solution at the selected $\beta$ and $Q_2$ values and for housing the plurality of the tubular membrane forward osmosis modules and the mixers, a draw solution inflow control valve and a pump for controlling the input draw solution flux $Q_2$, a draw solution inflow and outflow check valves for preventing backflow, a pressure gauge and control valve and control pump thereof for adjusting vessel pressure, a pressure relief valve for preventing vessel pressure beyond the level of $p_2$ to assist in maintaining steady-state continuous flow condition of the pressurized PEO module, and an energy exchange and fluid recovery device to supply the input hydraulic pressure $p_2$, and the input draw solution flux $Q_2$, for the generation of the power amount of $p_2(Q_1+Q_2)$ in the main PEO forward osmosis module, the energy exchange and fluid recover device further comprising a pressure exchanger, the pressure exchanger further comprising a low-pressure draw solution input flow port for inputting a low-pressure fluid, a high-pressure draw solution output flow port for forming the draw solution with required hydraulic pressure $p_2$ and flux $Q_2$ a high-pressure high-concentration fluid input port for bringing in higher energy content fluid for the pressure exchanger, a venturi injector unit comprising a connection pipe to the pressure exchanger for bringing back low-pressure high-concentration fluid, the venturi injector unit further comprising a low-pressure fluid input port for inputting the low-pressure high-concentration fluid from the pressure exchanger, a high-pressure high-concentration fluid input port for injecting the high-pressure high-concentration fluid, and a high-pressure outflow port for forming a mixed high-pressure outflow for re-concentration.

2. A PEO surficial energy generation system, comprising the PEO system of claim 1 to maximize generation of osmotic energy, and devices for synergistic effects, wherein the PEO surficial energy generation system is installed above ground; the PEO system is used to maximize energy generation to a power amount of $p_2(Q_1+Q_2)$; and the devices for synergistic effects further comprise an extra energy generating unit and the energy exchange and fluid recovery device as described in claim 1 to supply extra energy with a power amount of $p_3(Q_3+Q_4)$ to re-concentrate and recycle the draw solution for a synergistic forward osmosis (FO) module and to supply the input hydraulic pressure $p_2$ for the main PEO forward osmosis module as described in claim 1 and the power amount of $p_2(Q_1+Q_2)$ by the main PEO forward osmosis module is then converting to electricity by a power generating system.

3. The PEO surficial energy generation system of claim 2, comprising:

(1) the main PEO forward osmosis module, using the selected $\beta$ value, the supply of the input a draw solution comprising seawater or brine with a flux $Q_2$ and a hydraulic pressure $p_2$, and the supply of a relatively lower concentration of the feed solution comprising river water or treated wastewater to generate a permeate flux $Q_1$, for the generation of power at $p_2(Q_1+Q_2)$ amount, (2) the extra energy generating unit, comprising a combination of the synergistic FO module and a nanofiltration (NF) or ultrafiltration (UF) unit of the devices for synergistic effects, the synergistic FO module further comprises a draw solution compartment and a feed solution compartment and limiting by a dilution factor $\beta_3$ and an input hydraulic pressure $p_3$ to the draw solution compartment of the synergist FO module to supply extra energy to the PEO surficial energy generation system with a power amount of $p_3(Q_3+Q_4)$, $\beta_3$ is selected in a range of 0.9 to 0.95 for the input draw solution flux of the synergistic FO module, $\beta_3=Q_3/(Q_3+Q_4)$, $Q_4$ is a permeate flux of the synergistic FO module, $Q_3$ is a input draw solution flux of the synergistic FO module, $p_3=\frac{1}{2}\alpha_3\beta_3\Delta\pi_o'$, $\alpha_3$ is a membrane efficiency factor representing a percentage of pressure remaining across a semipermeable membrane of the synergistic FO module, and $\Delta\pi_o'$ is a theoretical maximum osmotic pressure differential of the synergistic FO module; and the NF or UF unit is using remaining energy after an energy exchange for the NF or UF unit to re-concentrate and recycle the draw solution for regenerating the input draw solution flux and the input hydraulic pressure $p_3$ for the synergistic FO module, (3) the energy exchange and fluid recovery device, the energy exchange and fluid recovery device further comprising an energy exchanger of synergistic devices for energy exchange of the power amount of $p_3(Q_3+Q_4)$ to energy required of the hydraulic pressure $p_2$ and the input draw solution flux $Q_2$, and a fluid recovery device for the recovery of remaining energy after the energy exchange for the NF or UF unit, and (4) a power generating system, comprising a hydraulic turbine and a generator locating after the main PEO forward osmosis module to convert available energy $p_2(Q_1+Q_2)$ into electricity.

4. The PEO surficial energy generation system of claim 3, wherein the input draw solution of the synergistic FO module comprises any of highly concentrated stable soluble inorganic salts of chloride, sulfate, or nitrate of magnesium and calcium, or stable nanoparticles or their combinations in order to generate enough energy $p_3(Q_3+Q_4)$, and the feed solution of the synergistic FO module (3330) comprises river water, treated wastewater or recycled water from the NF or UF unit (3329) permeate.

5. The PEO surficial energy generation system of claim 4, wherein the nanoparticles comprise silicon dioxide, titanium dioxide, nano-silicon crystal, nano-titanium particle, nano-clay minerals, nontoxic metallic oxides, or a combination thereof, and the nanoparticles are in a particle size range of 1 nm to 1000 nm, and
   wherein when the particle size is greater than 5 nm, the UF unit is selected for the input draw solution re-concentration and recovery.

6. A PEO energy generation system for further maximizing and simultaneously extraction energy out from the PEO system of claim 1, wherein the PEO energy generation system is a PEO subsurface energy generation system that is installed near an estuary or a large salt lake area in either underground or submarine environment, with gravitational potential of seawater or salt lake water for supplying the hydraulic pressure $p_2$, heat generated from power generation facilities to increase osmotic pressure and permeate flux, and an uplift chamber to dissipate pressure released flow after power generation by density reduction through heating, sparging, and dilution of less dense saltwater.

7. The PEO subsurface energy generation system of claim 6, wherein the system comprises:
   (1) an underground or a submarine structure, at a depth not less than the hydraulic head of $p_2$, to hold all facilities of the related PEO subsurface energy generation system,
   (2) an aboveground feed water intake and water purification unit, for the removal of suspended solids and supply of feed solution,
   (3) an extra hydropower plant, using the hydraulic head difference between the water purification unit and the associated underground turbine/generator to generate extra energy,
   (4) a PEO module, using the hydraulic head created by the selected depth $p_2$ to withdraw the seawater or the lake brine with a flux $Q_2$ as the draw solution, and the river water or treated wastewater mentioned in Item (2) above as the feed solution to generate permeate flux $Q_1$, for the generation of power by the subsequent turbine and generator,
   (5) power generating systems, comprising hydraulic turbines and generators for converting $p_2(Q_1+Q_2)$ energy from the step (4) above to generate energy, and
   (6) an uplifting chamber, to dissipate pressure released flow after power generation to the ocean or the lake.

8. The uplifting chamber device according to claim 6, comprising:
   a cylindrical stainless-steel housing comprising a narrow fluid passage in a center for creating a fast-flowing low-pressure current,
   a low-pressure fluid injection port for allowing mixing of a low-pressure fluid with a higher-pressure fluid without a pump,
   a high-pressure fluid inflow port for allowing the high-pressure fluid automatically to input into a bottom area of the uplifting chamber,
   a sparging air injection port for creating a fast-flowing uplifting current through the narrow low-pressure fluid passage, and
   a mixed solution outflow port for outputting mixed solution for dissipation with aid of density reduction and fast-flowing uplifting current generated.

9. A method for maximizing generation of osmotic energy from the PEO system as described in claim 2, comprising:
   (1) applying the PEO a forward osmosis module as described in claim 2 and controlling the module to a steady-state and continuous flow condition for the input of the draw and feed solution fluxes as well as generation of the permeate flux,
   (2) selecting a dilution factor $\beta$ for the PEO module in a range of 0.85 to 0.95, and more favorably in the range of 0.9 to 0.95, wherein $\beta=Q_2/(Q_1+Q_2)$, $Q_1$ is a permeate flux, and $Q_2$ is an input draw solution flux,
   (3) selecting either $Q_1$ or $Q_2$ based on available supply, when $Q_1$ is selected the other $Q_2$ can be estimated from the equation listed in step (2) above, vice versa,
   (4) introducing the draw solution to the draw solution compartment of the PEO module at a hydraulic pressure $p_2$, wherein $p_2=\frac{1}{2}\alpha\beta\Delta\pi_o$, $\alpha$ is membrane efficiency factor representing a percentage of pressure remaining across the semipermeable membrane of the PEO module, and $\Delta\pi_o$ is a theoretical maximum osmotic pressure differential of the PEO module,
   (5) identifying the total required membrane area, A, wherein $A=Q_1/(\frac{1}{2}\beta J_e)$, $J_e$ is the membrane unit permeate flux at $\Delta\pi_e$ obtained by experiment or supply by the membrane supplier, $\Delta\pi_e$ is the maximum effective osmotic pressure differential which $\Delta\pi_e=\alpha\Delta\pi_o$, and
   (6) generating energy by the PEO module with a theoretical maximum power output of $W_{max}$, wherein $W_{max}=p_2(Q_1+Q_2)$.

* * * * *